(12) United States Patent
Shimizu

(10) Patent No.: US 11,985,365 B2
(45) Date of Patent: May 14, 2024

(54) INFORMATION PROCESSING DEVICE, INFORMATION PROCESSING SYSTEM, AND INFORMATION PROCESSING METHOD

(71) Applicant: SONY GROUP CORPORATION, Tokyo (JP)

(72) Inventor: Takayoshi Shimizu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/760,898

(22) PCT Filed: Aug. 6, 2020

(86) PCT No.: PCT/JP2020/030192
§ 371 (c)(1),
(2) Date: Mar. 16, 2022

(87) PCT Pub. No.: WO2021/059770
PCT Pub. Date: Apr. 1, 2021

(65) Prior Publication Data
US 2022/0345760 A1  Oct. 27, 2022

(30) Foreign Application Priority Data
Sep. 24, 2019 (JP) .................................. 2019-173496

(51) Int. Cl.
*H04N 21/234* (2011.01)
*G06V 10/74* (2022.01)
(Continued)

(52) U.S. Cl.
CPC ....... *H04N 21/23424* (2013.01); *G06V 10/50* (2022.01); *G06V 10/60* (2022.01); *G06V 10/761* (2022.01); *H04N 21/6587* (2013.01)

(58) Field of Classification Search
CPC ...... G06V 10/50; G06V 10/60; G06V 10/761; H04N 21/8541; H04N 21/4415
See application file for complete search history.

(56) References Cited

U.S. PATENT DOCUMENTS 7,555,766 B2    6/2009  Kondo et al.
11,778,263 B2 * 10/2023  Tang .................... H04N 21/431
                                                                725/37
(Continued)

FOREIGN PATENT DOCUMENTS

CA      2951029 A1    12/2015
CN      106573175 A    4/2017
(Continued)

OTHER PUBLICATIONS

International Search Report and Written Opinion of PCT Application No. PCT/JP2020/030192, dated Nov. 10, 2020, 10 pages of ISRWO.

*Primary Examiner* — Frank Johnson
(74) *Attorney, Agent, or Firm* — CHIP LAW GROUP

(57) ABSTRACT

There is provided a device and method for playing back a performer reaction image frame in response to a user action on playback content, the performer reaction image frame including a scene of the performer in reaction. In a case where a user action on the playback content is detected and the user action is detected, a playback image frame in the playback content is replaced with a performer reaction image frame including a scene of a performer in reaction, and the performer reaction image frame is played back. A data processing unit calculates a similarity rate between the playback image frame at a time of detection of the user action and a performer reaction image frame, and selects and plays back a performer reaction image frame of which calculated similarity rate is equal to or higher than a predetermined threshold value.

16 Claims, 18 Drawing Sheets

(51) Int. Cl.
    *G06V 10/60*     (2022.01)
    *G06V 10/50*     (2022.01)
    *H04N 21/6587*     (2011.01)

(56) References Cited

U.S. PATENT DOCUMENTS

| | | | |
|---|---|---|---|
| 2013/0016910 A1* | 1/2013 | Murata | H04N 21/8583 |
| | | | 382/195 |
| 2015/0358574 A1 | 12/2015 | Henion et al. | |
| 2016/0182955 A1* | 6/2016 | Klappert | H04N 21/44204 |
| | | | 725/14 |
| 2017/0264954 A1* | 9/2017 | Nakagawa | H04N 21/44008 |
| 2020/0077148 A1* | 3/2020 | Shirai | G06F 3/011 |
| 2020/0296480 A1* | 9/2020 | Chappell, III | H04N 21/8545 |
| 2021/0056407 A1* | 2/2021 | Buesser | G06N 3/08 |
| 2022/0182251 A1* | 6/2022 | Jacobs | H04N 21/84 |

FOREIGN PATENT DOCUMENTS

| | | |
|---|---|---|
| EP | 3151938 A1 | 4/2017 |
| JP | 2002-109116 A | 4/2002 |
| JP | 2016-083225 A | 5/2016 |
| JP | 2017-527142 A | 9/2017 |
| KR | 10-2017-0015466 A | 2/2017 |
| WO | 2015/187685 A1 | 12/2015 |

\* cited by examiner

FIG. 6

| (1) PLAYBACK IMAGE FRAME NUMBER | (2) NUMBER FOR PERFORMER REACTION IMAGE FRAME FOR REPLACEMENT | |
|---|---|---|
| | Start FRAME | End FRAME |
| 0 | n/a | n/a |
| 1 | n/a | n/a |
| ⋮ | ⋮ | ⋮ |
| N | Ps(N) | Pe(N) |
| ⋮ | ⋮ | ⋮ |
| N+n | Ps(N+n) | Pe(N+n) |
| ⋮ | ⋮ | ⋮ |

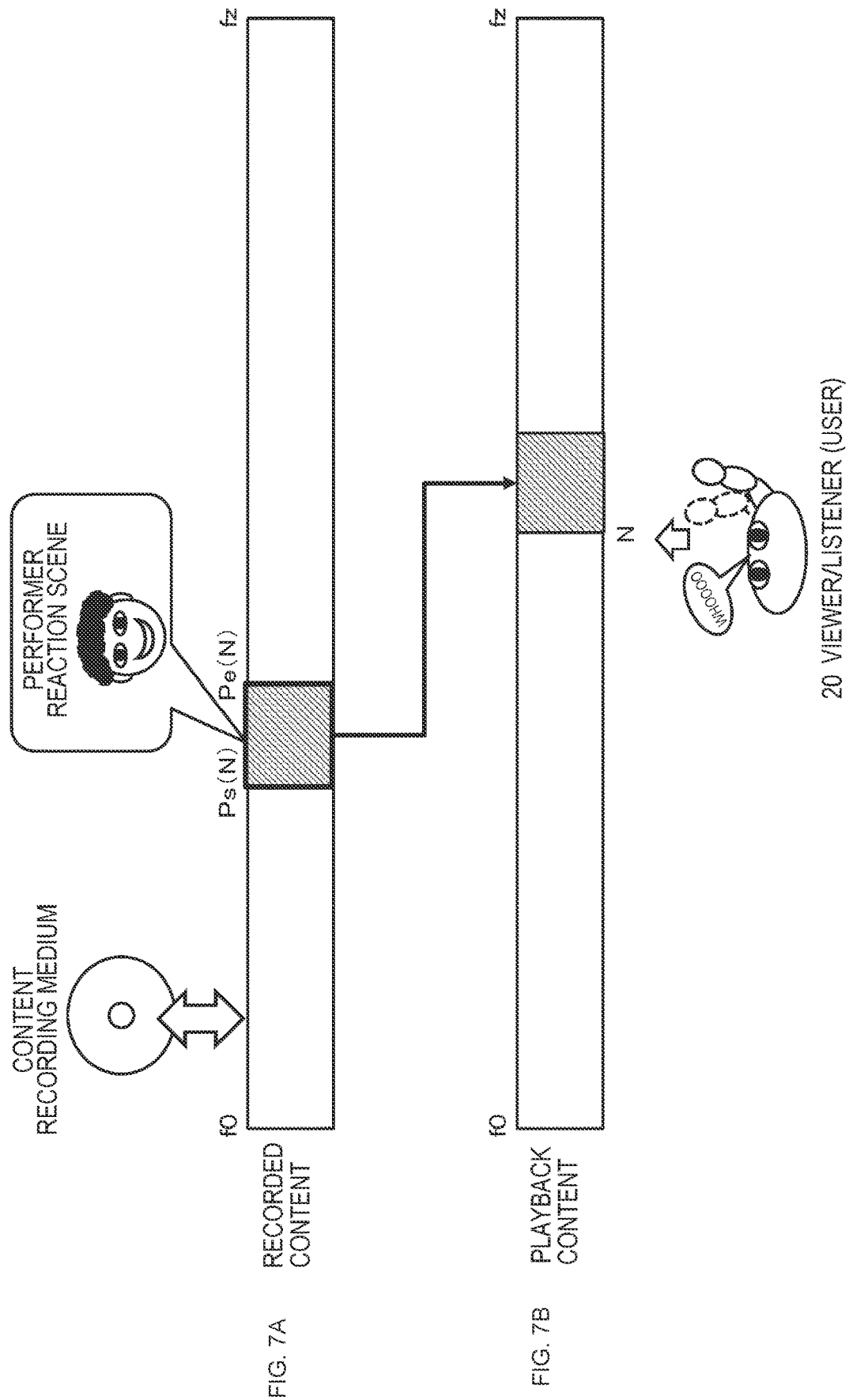

FIG. 8

| (1) PLAYBACK IMAGE FRAME NUMBER | (2) NUMBER FOR PERFORMER REACTION IMAGE FRAME FOR REPLACEMENT (BY VIEWER/LISTENER ACTION TYPE) |  |  |  |  |  |  |  |
|---|---|---|---|---|---|---|---|---|
| | (2a) SUPPORT BY VOICE | | (2b) HANDWAVING | | (2c) HAND POSE (RAISING FIST, OR THE LIKE) | | (2d) THROWING ITEM | |
| | Start FRAME | End FRAME | Start FRAME | End FRAME | Start FRAME | End FRAME | Start FRAME | End FRAME |
| 0 | n/a | n/a | n/a | n/a | n/a | n/a | n/a | n/a |
| 1 | n/a | n/a | n/a | n/a | n/a | n/a | n/a | n/a |
| ⋮ | ⋮ | ⋮ | ⋮ | ⋮ | ⋮ | ⋮ | ⋮ | ⋮ |
| N | Ps(N) | Pe(N) | Qs(N) | Qe(N) | Rs(N) | Re(N) | Ss(N) | Se(N) |
| ⋮ | ⋮ | ⋮ | ⋮ | ⋮ | ⋮ | ⋮ | ⋮ | ⋮ |
| N+n | Ps(N+n) | Pe(N+n) | Qs(N+n) | Qe(N+n) | Rs(N+n) | Re(N+n) | Ss(N+n) | Se(N+n) |
| ⋮ | ⋮ | ⋮ | ⋮ | ⋮ | ⋮ | ⋮ | ⋮ | ⋮ |

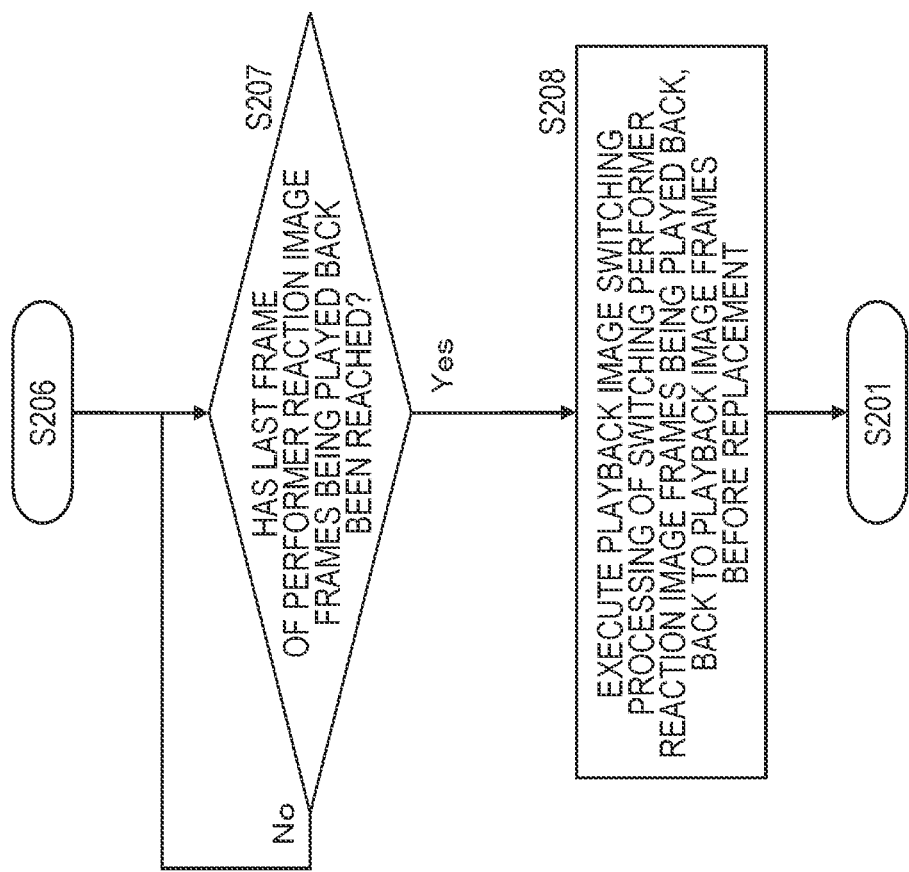

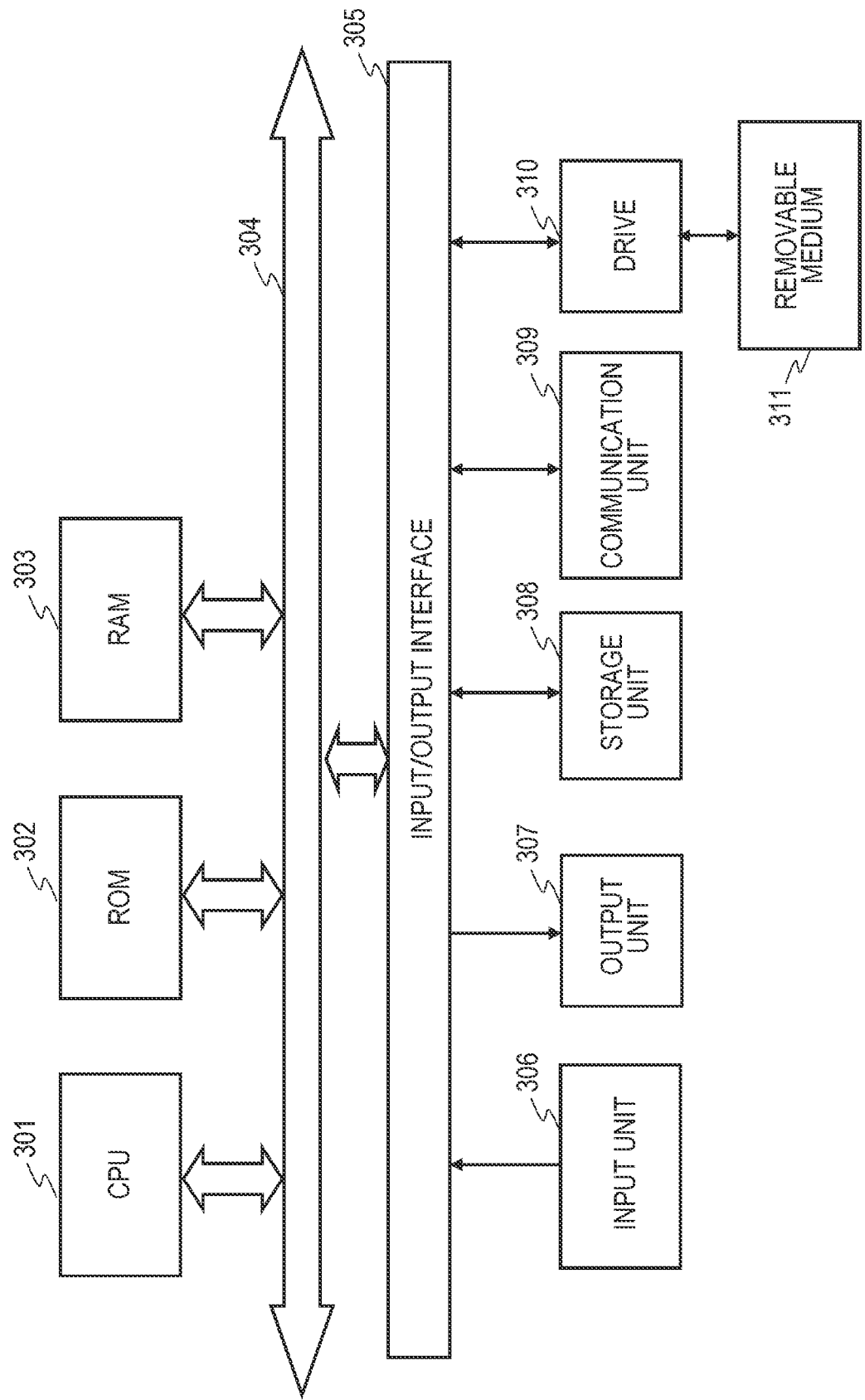

INFORMATION PROCESSING DEVICE, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2020/030192 filed on Aug. 6, 2020, which claims priority benefit of Japanese Patent Application No. JP 2019-173496 filed in the JapAugustan Patent Office on Sep. 24, 2019. Each of the above-referenced applications is hereby incorporated herein by reference in its entirety.

TECHNICAL FIELD

The present disclosure relates to an information processing device, an information processing system, and an information processing method, and a program. More specifically, the present disclosure relates to an information processing device, an information processing system, and an information processing method, and a program that enable playback of a reaction image of a performer in response to a viewer/listener action at a time of content playback.

BACKGROUND ART

Currently, content distribution via a network is in vogue. For example, in a case where live content of a certain performer such as a singer is distributed, it is possible to notify, in real time, the performer side of an action of a viewer/listener, for example, a viewer/listener action in which the viewer/listener supports the performer by waving a hand, input a message, or the like.

Furthermore, interactive content distribution is also performed in which the performer side reacts to the viewer/listener action by answering with a smile, giving a message such as a thank you, or waving a hand, and an image of the reaction is distributed as is.

However, such interactive content distribution can be performed only with live content, that is, live streaming of content.

For example, in a case where pre-recorded content is played back, the performer has no reaction even if the viewer/listener performs a viewer/listener action of supporting the performer on the pre-recorded content, by waving a hand, inputting a message or the like.

Such content playback without a reaction is a factor of reducing interest of the viewer/listener.

Note that Patent Document 1 (Japanese Patent Application Laid-Open No. 2016-083225) discloses a configuration in which an own image is distributed along with game content.

However, in this configuration, although the game content is pre-recorded content, distribution of the captured image of own is live streaming of a current captured image of own.

That is, a live streaming image is utilized for an action image and reaction image to be distributed.

CITATION LIST

Patent Document

Patent Document 1: Japanese Patent Application Laid-Open No. 2016-083225

SUMMARY OF THE INVENTION

Problems to be Solved by the Invention

The present disclosure provides an information processing device, an information processing system, and an information processing method, and a program that enable playback of a reaction image of a performer in response to a viewer/listener action even in a case where distribution content or playback content is not live content (live streaming content) but pre-recorded content.

Solutions to Problems

A first aspect of the present disclosure is an information processing device including a data processing unit that, in a case where a user action on playback content is detected, replaces a playback image frame in the playback content with a performer reaction image frame including a scene of a performer in reaction, and plays back the performer reaction image frame.

Moreover, a second aspect of the present disclosure is an information processing system including a content distribution server and a content playback device, in which the content playback device plays back distribution content in the content distribution server, and detects a user action on playback content, and transmits detected user action information to the content distribution server, and the content distribution server, according to the user action information received from the content playback device, replaces an image frame in the distribution content with a performer reaction image frame including a scene of a performer in reaction, and distributes the performer reaction image frame.

Moreover, a third aspect of the present disclosure is an information processing method executed in an information processing device, in which a data processing unit, in a case where a user action on playback content is detected, replaces a playback image frame in the playback content with a performer reaction image frame including a scene of a performer in reaction, and plays back the performer reaction image frame.

Moreover, a fourth aspect of the present disclosure is an information processing method executed in an information processing system including a content distribution server and a content playback device, in which the content playback device plays back distribution content in the content distribution server, and detects a user action on playback content, and transmits detected user action information to the content distribution server, and the content distribution server, according to the user action information received from the content playback device, replaces an image frame in the distribution content with a performer reaction image frame including a scene of a performer in reaction, and distributes the performer reaction image frame.

Moreover, a fifth aspect of the present disclosure is a program causing an information processing device execute information processing, and causing a data processing unit to, in a case where a user action on playback content is detected, replace a playback image frame in the playback content with a performer reaction image frame including a scene of a performer in reaction, and play back the performer reaction image frame.

Note that a program according to the present disclosure is, for example, a program that can be provided by a storage medium or communication medium provided in a computer-readable format to an information processing device or a computer system capable of executing various program codes. By providing such a program in a computer-readable format, processing according to the program is achieved on the information processing device or the computer system.

Still other objects, features, and advantages according to the present disclosure will be apparent from more detailed description based on embodiments of the present disclosure described later and the accompanying drawings. Note that, in the present specification, a system refers to a logical set of a plurality of devices, and is not limited to a device having each configuration in the same housing.

According to a configuration of one embodiment according to the present disclosure, there is achieved a device and method for playing back a performer reaction image frame in response to a user action on playback content, the performer reaction image frame including a scene of a performer in reaction.

Specifically, for example, in a case where a user action on the playback content is detected and the user action is detected, the playback image frame in the playback content is replaced with a performer reaction image frame including a scene of a performer in reaction and the performer reaction image frame is played back. A data processing unit calculates a similarity rate between the playback image frame at a time of detection of the user action and a performer reaction image frame, and selects and plays back a performer reaction image frame of which calculated similarity rate is equal to or higher than a predetermined threshold value.

According to the configuration, there is achieved a device and method for playing back a performer reaction image frame in response to a user action on playback content, the performer reaction image frame including a scene of a performer in reaction.

Note that the effects described in the present specification are only examples, and the effects of the present technology are not limited to these effects. Additional effects may also be obtained.

BRIEF DESCRIPTION OF DRAWINGS

FIG. 6 is a diagram describing an example of registration data stored in a storage unit of the information processing device according to the present disclosure.

FIGS. 7A and 7B are diagrams describing the processing executed by the information processing device according to the present disclosure.

FIG. 8 is a diagram describing an example of registration data stored in a storage unit of the information processing device according to the present disclosure.

FIG. 17 is a diagram illustrating a flowchart describing the sequence of the processing executed by the information processing device according to the present disclosure.

FIG. 18 is a diagram describing a hardware configuration example of the information processing device according to the present disclosure.

MODE FOR CARRYING OUT THE INVENTION

Figure 1:
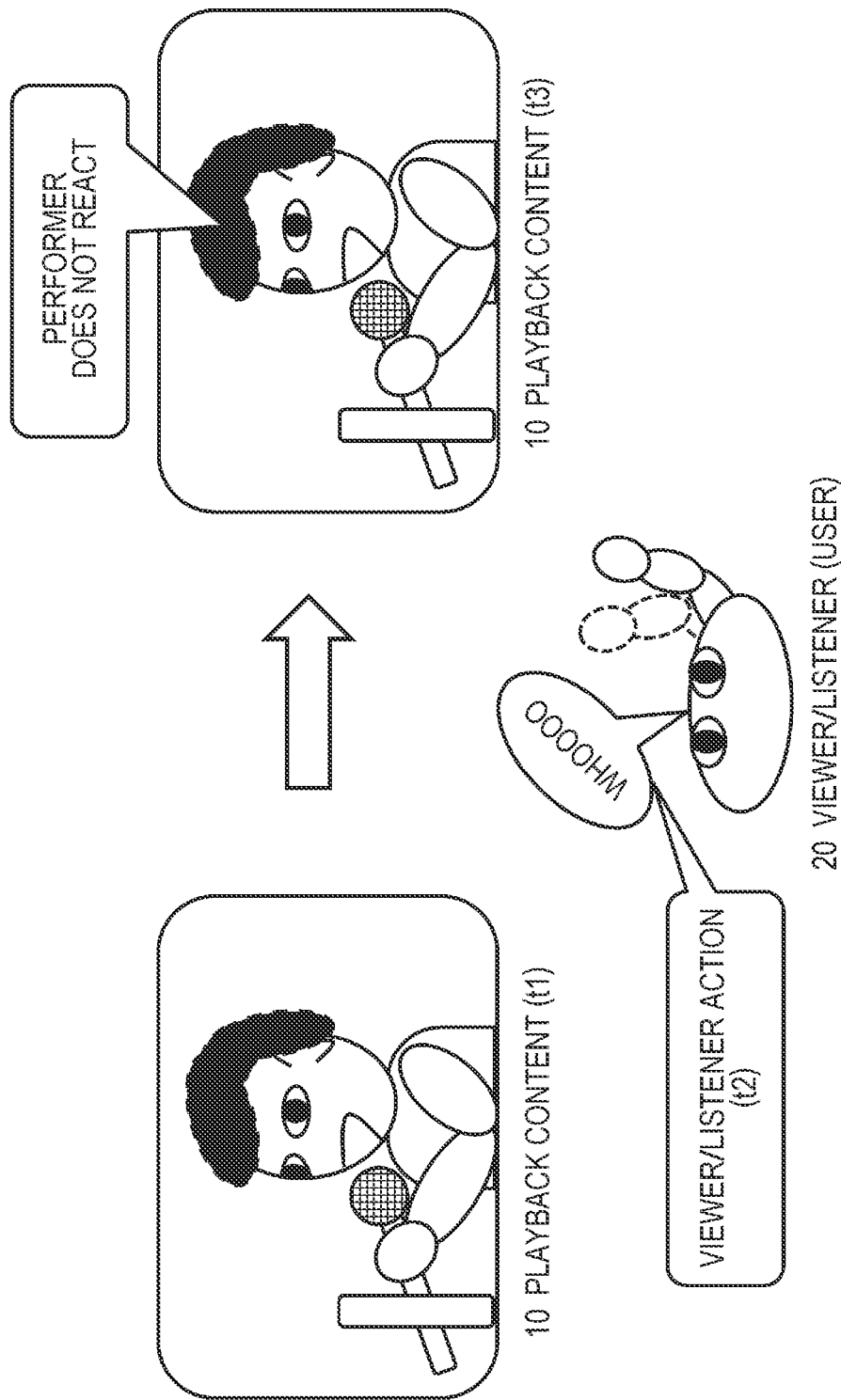
FIG. 1 is a diagram describing an example of content playback processing.

Hereinafter, an information processing device, an information processing system, and an information processing method, and a program according to the present disclosure will be described in detail with reference to the drawings. Note that the description will be made according to the following items.

1. Overview of processing executed by information processing device according to present disclosure
2. Details of playback content replacement processing executed by information processing device according to present disclosure
3. Configuration for utilizing performer reaction image previously stored in storage unit
4. Configuration examples of information processing device and information processing system
5. Processing sequence of content replacement processing executed by information processing device
6. Other embodiments
7. Hardware configuration example of information processing device
8. Conclusion of configuration according to present disclosure

1. OVERVIEW OF PROCESSING EXECUTED BY INFORMATION PROCESSING DEVICE ACCORDING TO PRESENT DISCLOSURE

First, an overview of processing executed by an information processing device according to the present disclosure will be described with reference to FIG. 1 and the subsequent drawings.

As described above, in distribution of live content, it is possible to notify, in real time, a performer side of an action of a viewer/listener, for example, a viewer/listener action in which the viewer/listener supports the performer by waving a hand, input a message, or the like. Furthermore, interactive content distribution can also be performed in which the performer side reacts to the viewer/listener action by answering with a smile, giving a message such as a thank you, or waving a hand, and an image of the reaction is distributed as is.

However, such interactive content distribution can be performed only with live content, that is, live streaming of content.

For example, in a case where pre-recorded content is played back, the performer has no reaction even if the viewer/listener performs a viewer/listener action of supporting the performer on the pre-recorded content, by waving a hand, inputting a message or the like.

FIG. 1 is a diagram illustrating an example of playback of pre-recorded content.

FIG. 1 illustrates playback content 10 and a viewer/listener (user) 20.

It is assumed that the viewer/listener performs an action (viewer/listener action) such as cheering or waving a hand in support for the performer in the playback content 10 at time t2 between time t1 and time t3 of the playback content.

However, even at the time t3 after the time t2, the performer in the playback content 10 is singing, not at all changing expression from the time t2 that is before the support.

That is, the performer continues performance without any change regardless of a support action of the viewer/listener (user) 20.

Such content playback without a reaction is a factor of reducing interest of the viewer/listener.

The information processing device according to the present disclosure solves such a problem.

An example of content playback executed by the information processing device according to the present disclosure will be described with reference to FIG. 2.

Figure 2:
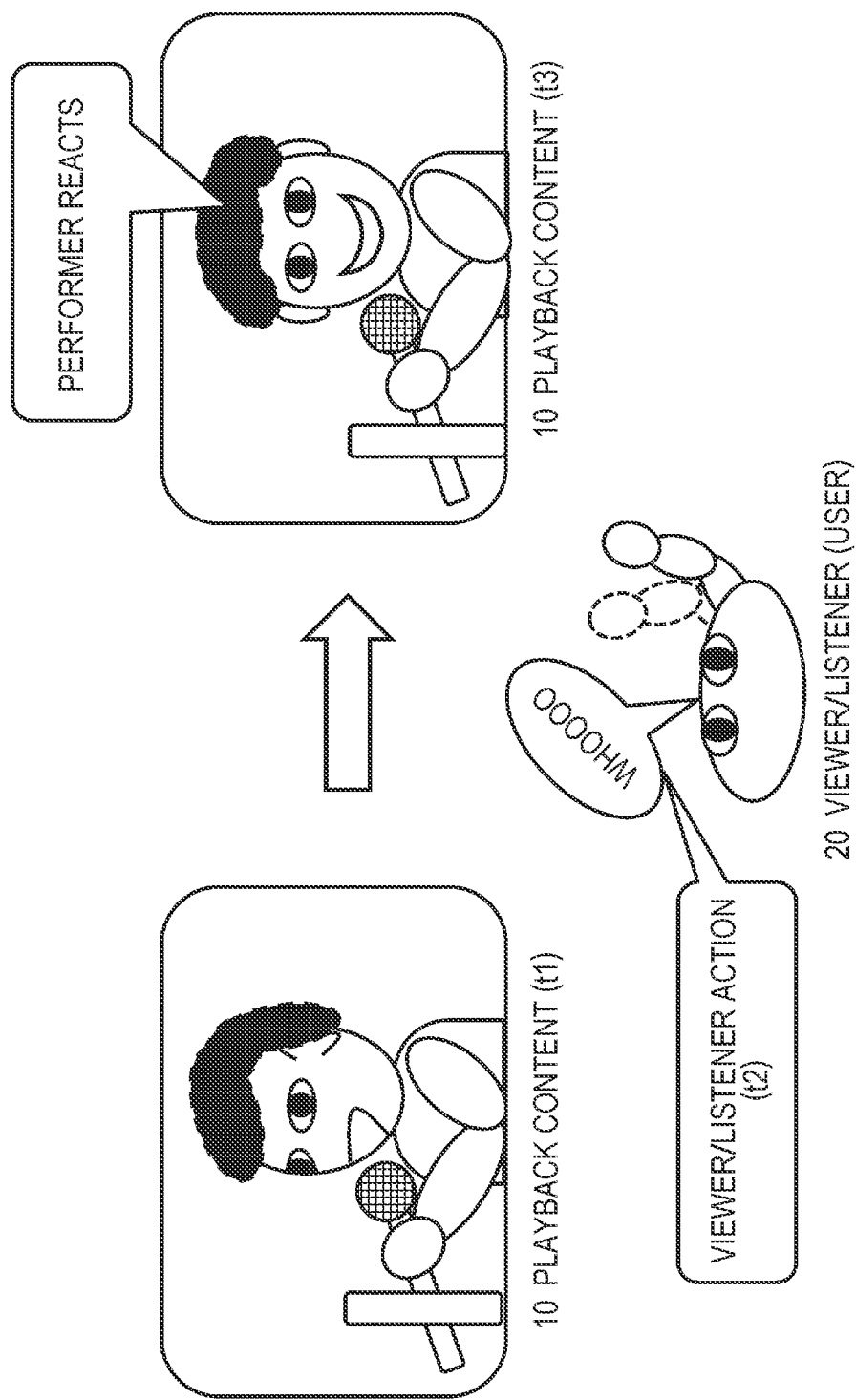
FIG. 2 is a diagram describing processing executed by an information processing device according to the present disclosure.

Similarly to FIG. 1, FIG. 2 is a diagram illustrating an example of playback of pre-recorded content.

Similarly to FIG. 1, FIG. 2 also illustrates the playback content 10 and the viewer/listener (user) 20.

The viewer/listener performs the action (viewer/listener action) such as cheering as support or waving a hand at the performer in the playback content 10 at the time t2 between the time t1 and the time t3 of the playback content.

When the viewer/listener action is detected at the time t2, the information processing device according to the present disclosure executes processing of replacing the playback content from a normal playback content to content including reaction of the performer Note that, although only image data is replaced, and audio data is not replaced in the present embodiment, audio data may also be replaced with audio data corresponding to the reaction image simultaneously with the image data.

As illustrated in FIG. 2, when the viewer/listener action is detected at the time t2, the playback content 10 at the time t3 immediately after the time t2 is replaced with an image showing a reaction of the performer looking toward the user side and smiling as if responding to the support from the user, and the image is played back.

By viewing such a performer reaction image, the viewer/listener (user) 20 can feel that the performer reacts to the viewer/listener action that is support from the viewer/listener (user) 20, and enjoyment of content viewing/listening is increased.

Thus, when detecting the viewer/listener action, and detecting the viewer/listener action, the information processing device according to the present disclosure executes processing of replacing the playback content from the normal playback content to the content including reaction of the performer.

2. DETAILS OF PLAYBACK CONTENT REPLACEMENT PROCESSING EXECUTED BY INFORMATION PROCESSING DEVICE ACCORDING TO PRESENT DISCLOSURE

Next, details of playback content replacement processing executed by the information processing device according to the present disclosure will be described.

Figure 3:
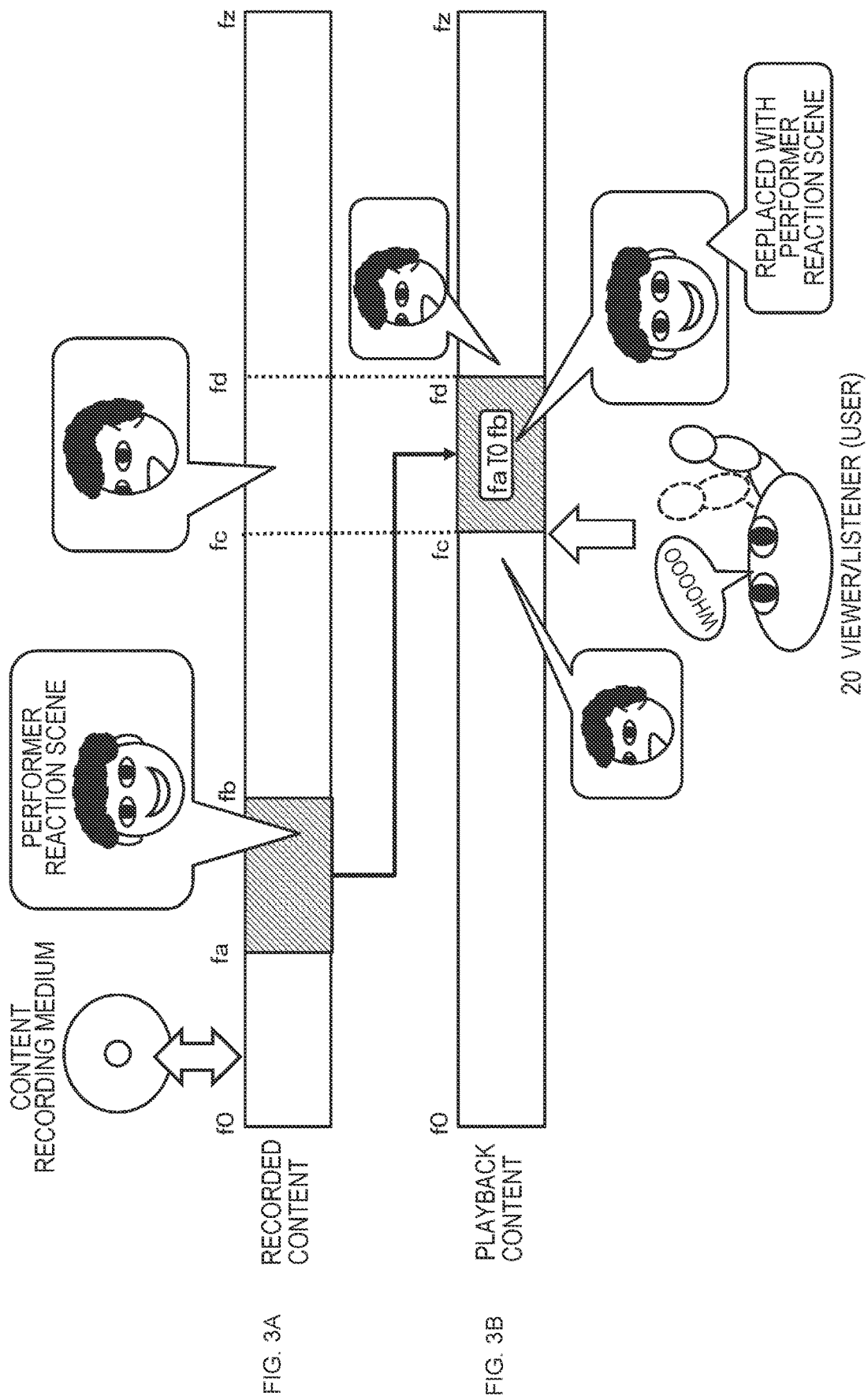
FIGS. 3A and 3B are diagrams describing the processing executed by the information processing device according to the present disclosure.

With reference to FIGS. 3A and 3B and the subsequent drawings, the details of playback content replacement processing executed by the information processing device according to the present disclosure will be described.

FIGS. 3A and 3B illustrate the following two pieces of content.

FIG. 3A Recorded content,

FIG. 3B Playback content,

FIG. 3A Recorded content is, for example, content recorded in a medium or the like, and is content to be played back.

FIG. 3B Playback content is content played back by utilizing recorded content, and is content viewed/listened by the viewer/listener (user) 20.

For both the content, passage of time is indicated from left to right, and a content start image frame is represented by f0 and a content end image frame is represented by fz.

Note that the content may be either 3D content or 2D content.

For example, the content is content in which the performer is singing a song.

The content partially includes an image frame in which the performer is singing while facing sideways as the performer at time (t1) illustrated in FIG. 2, and includes an image frame in which the performer is smiling while facing front as the performer at time (t3) illustrated in FIG. 2.

It is assumed that image frames of image frames fa to fb in FIG. 3A Recorded content illustrated in FIGS. 3A and 3B are image frames in which the performer is smiling while facing front as the performer at time (t3) illustrated in FIG. 2.

The information processing device according to the present disclosure selects, for example, the image frames fa to fb in which the performer is smiling while facing the front, as a performer reaction scene (performer reaction image frame).

At a time point of playing back an image frame fc after start of playback of FIG. 3B Playback content illustrated in FIGS. 3A and 3B, if the viewer/listener (user) 20 performs a viewer/listener action (user action) such as cheering as support or waving a hand at the performer in the playback content, the information processing device according to the present disclosure detects that the viewer/listener action has been performed.

In response to detection of the viewer/listener action, the information processing device according to the present disclosure performs processing of replacing the playback image frames in the playback content to a performer reaction scene (performer reaction image frames) included in FIG. 3A Recorded content, and playing back the performer reaction scene.

That is, the image frames fc to fd in the recorded content that are original playback images are replaced with performer reaction image frames fa to fb, and the image frames fa to fb are played back.

Regarding audio, audio corresponding to the image frames fc to fd in the recorded content is continuously played back as is. In this embodiment, only images are replaced with images of a performer reaction scene and played back. In this regard, as described above, along with replacement of image data, audio data may also be replaced with audio data corresponding to a reaction image.

As a result of the image replacement processing, by viewing the performer reaction image, the viewer/listener (user) 20 can feel that the performer reacts to the viewer/listener action that is support from the viewer/listener (user) 20, and can further enjoy viewing/listening the content.

Note that, in a case where the information processing device according to the present disclosure performs content replacement, in order to reduce unnaturalness caused by image switching, the information processing device performs processing of determining similarity rates between the image being played back and replacement images, and selecting an image having a higher similarity rate as a replacement image.

A specific example of processing of determining a similarity rate between an image being played back and replacement images will be described with reference to FIGS. 4A and 4B.

Similarly to FIGS. 3A and 3B, FIGS. 4A and 4B illustrate the following two pieces of content.

Figure 4:
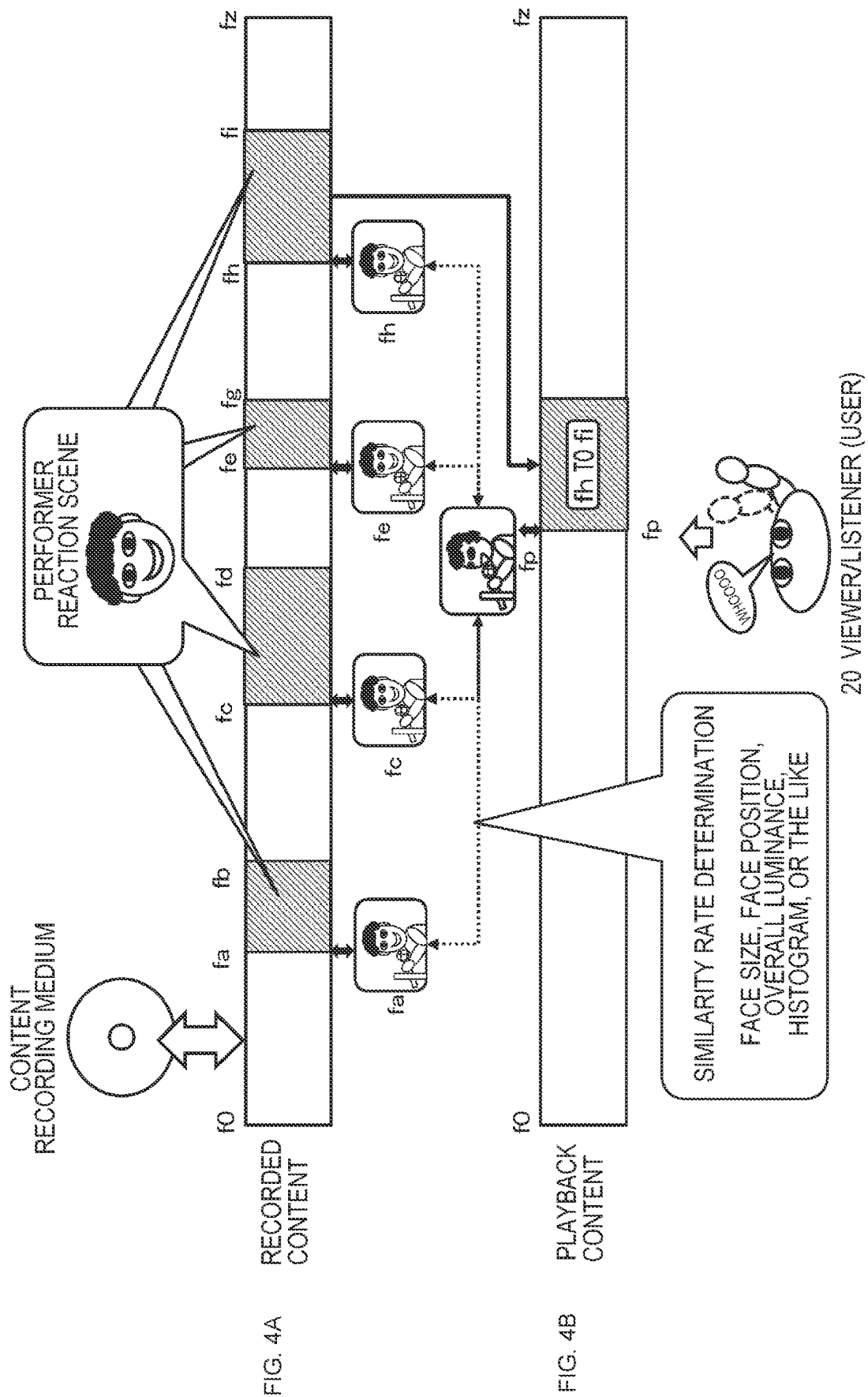
FIGS. 4A and 4B are diagrams describing the processing executed by the information processing device according to the present disclosure.

FIG. 4A Recorded content,

FIG. 4B Playback content,

FIG. 4A Recorded content is, for example, content recorded in a medium or the like, and is content to be played back.

FIG. 4B Playback content is content played back by utilizing recorded content, and is content viewed/listened by the viewer/listener (user) 20.

For both the content, passage of time is indicated from left to right, and a content start image frame is represented by f0 and a content end image frame is represented by fz.

Note that the content may be either 3D content or 2D content.

Here, it is assumed that FIG. 4A Recorded content includes a plurality of performer reaction scenes. That is, it is assumed that (1) image frame section including image frames fa to fb
(2) image frame section including image frames fc to fd
(3) image frame section including image frames fe to fg
(4) image frame section including image frames fh to fi these following four image frame sections are image frame sections including scenes of images in which the performer is smiling while facing the front, and scenes of performer reaction images that can be displayed in response to an action by the user.

It is assumed that the viewer/listener (user) 20 performs a viewer/listener action of supporting the performer at a time of viewing/listening an image playback frame fp in (FIG. 4B) Playback content in FIGS. 4A and 4B.

In order to replace a subsequent playback image with image frames including scenes of performer reaction images according to the viewer/listener action, the information processing device according to the present disclosure first selects performer reaction image frame sections (1) to (4) described above as replacement image frame section candidates.

Next, the information processing device performs processing of selecting, from among the plurality of performer reaction image frame sections, one performer reaction image frame section as final replacement image frames.

This selection processing is executed on the basis of the similarity rates of the images.

That is, similarity rates between the playback image frame fp in FIG. 4B Playback content in which the viewer/listener action is detected and start image frames of the performer reaction image frame sections included in FIG. 4A Recorded content are determined.

That is, similarity rates between the playback image frame fp in FIG. 4B Playback content in which the viewer/listener action is detected and the start image frames of the performer reaction image frame sections included in FIG. 4A Recorded content, that is, the following four start image frames, are calculated.

(1) Start image frame fa of the image frame section including the image frames fa to fb
(2) Start image frame fc of the image frame section including the image frames fc to fd
(3) Start image frame fe of the image frame section including the image frames fe to fg
(4) Start image frame fh of the image frame section including the image frames fh to fi At least one of the following evaluation indices, for example, is utilized as an evaluation index of similarity rate.

(a) A face size of a face included in an image frame (SRfs)
(b) A face position of a face included in an image frame (SRfp)
(c) An overall luminance of an image frame (SRL)
(d) A pixel value histogram of an entire image frame (SRH)

(a) A face size of a face included in an image frame (SRfs) is a similarity rate for face size (Similarity Rate for Face Space: SRfs) of the face of the performer included in two image frames subjected to similarity rate determination, and it is determined that the higher a degree of coincidence in the face sizes, the higher the similarity rate, and the lower the degree of coincidence in the face sizes, the lower the similarity rate.

For example, similarity rate index values such as follows are calculated.

SRfs=10 in a case where the face sizes perfectly match each other,

SRfs=9 in a case where a difference in the face sizes is 10% or less,

SRfs=8 in a case where the difference in the face sizes is between 10% and 20%,

SRfs=7 in a case where the difference in the face sizes is between 20% and 30%,

SRfs=1 in a case where the difference in the face sizes is between 80% and 90%, and SRfs=0 in a case where the difference in the face sizes is 90% or more.

(b) A face position of a face included in an image frame (SRfp) is a similarity rate for face position (Similarity Rate for Face Position: SRfp) of the face of the performer included in two image frames subjected to similarity rate determination, and it is determined that the greater a degree of coincidence in the face positions in the image frames, the higher the similarity rate, and the lower the degree of coincidence in the face positions, the lower the similarity rate.

For example, similarity rate index values such as follows are calculated.

SRfp=10 in a case where the face positions perfectly match each other,

SRfp=9 in a case where a difference in face positions is 10% or less of an image frame width, SRfp=8 in a case where the difference in face positions is between 10% and 20% of the image frame width, SRfp=7 in a case where the difference in face positions is between 20% and 30% of the image frame width, SRfp=1 in a case where the difference in face positions is between 80% and 90% of the image frame width, and SRfp=0 in a case where the difference in face positions is 90% or more of the image frame width.

(c) An overall luminance of an image frame (SRL) is a similarity rate for overall luminance (Similarity Rate for Luminance: SRL) of two image frames subjected to similarity rate determination, and it is determined that the greater a degree of coincidence in average luminance values of the image frames, the higher the similarity rate, and the lower the degree of coincidence in the average luminance value, the lower the similarity rate.

For example, similarity rate index values such as follows are calculated.

SRL=10 in a case where the average luminance values of the image frames perfectly match each other, SRL=9 in a case where a difference in the average luminance values of the image frames is 10% or less, SRL=8 in a case where the difference in the average luminance values of the image frames is between 10% and 20%, SRL=7 in a case where the difference in the average luminance values of the image frames is between 20% and 30%, SRL=1 in a case where the difference in the average luminance values of the image frames is between 80% and 90%, and SRL=0 in a case where the difference in the average luminance values of the image frames is 90% or more.

(d) A pixel value histogram of an entire image frame (SRH) is a similarity rate for pixel value histograms (Similarity Rate for Histogram: SRH) of two entire image frames subjected to similarity rate determination, and it is determined that the greater a degree of coincidence in pixel value histograms of the image frames, the higher the similarity rate, and the lower the degree of coincidence in the pixel value histograms, the lower the similarity rate.

For example, similarity rate index values such as follows are calculated.

SRH=10 in a case where the pixel value histograms of the image frames perfectly match each other, SRH=9 in a case where difference in the pixel value histograms of the image frames is 10% or less, SRH=8 in a case where the difference in the pixel value histograms of the image frames is between 10% and 20%, SRH=7 in a case where difference in the pixel value histograms of the image frames is between 20% and 30%, SRH=1 in a case where difference in the pixel value histograms of the image frames is between 80% and 90%, and SRH=0 in a case where difference in the pixel value histograms of the image frames is 90% or more.

The information processing device according to the present disclosure calculates the above-described four types of similarity rate evaluation index values, that is, (a) a face size of a face included in an image frame (SRfs), (b) a face position of a face included in an image frame (SRfp), (c) an overall luminance of an image frame (SRL), and (d) a pixel value histogram of an entire image frame (SRH), and then, calculates a final similarity rate (Similarity Rate: SR) according to following (Mathematical formula 1).

$$SR=(w1 \times SRfs)+(w2 \times SRfp)+(w3 \times SRL)+(w4 \times SRH) \quad \text{(Mathematical formula 1)}$$

In (Mathematical formula 1) described above, w1 to w4 are predetermined weighting factors.

According to (Mathematical formula 1) described above, similarity rates between the playback image frame fp in FIG. 4B Playback content in which the viewer/listener action is detected, and the start image frames of the performer reaction image frames included in FIG. 4A Recorded content, that is, the following four start image frames, are calculated.

(1) Start image frame fa of the image frame section including the image frames fa to fb (2) Start image frame fc of the image frame section including the image frames fc to fd (3) Start image frame fe of the image frame section including the image frames fe to fg (4) Start image frame fh of the image frame section including the image frames fh to fi The image processing device according to the present disclosure selects an image frame indicating a highest similarity rate among similarity rates between the playback image frame fp in FIG. 4B Playback content in which the viewer/listener action is detected and the four start image frames (1) to (4) described above.

Moreover, the similarity rate value of the selected image frame having the highest similarity rate (SRmax) is compared with the predetermined threshold value (SRth).

$$SRmax \geq SRth \quad \text{(Determination formula A)}$$

In a case where the similarity rate of the image frame indicating the highest similarity rate (SRmax) satisfies (Determination formula A) described above, that is, in a case where the similarity rate of the image frame indicating the highest similarity rate (SRmax) is a similarity rate equal to or higher than the predetermined threshold value (SRth), the playback image is replaced with image frames of the performer reaction scene that have this image frame as a start image frame and is played back.

That is, it is assumed, in the example illustrated in FIGS. 4A and 4B for example, that an image frame of the performer reaction scene, the image frame indicating a highest similarity rate to the playback image frame fp in FIG. 4B Playback content in which the viewer/listener action is detected, is (4) Start image frame fh of the image frame section including the image frames fh to fi in FIG. 4A Recorded content.

When it is determined that a value of the similarity rate (SRmax) of the start image frame fh in (4) described above is equal to or greater than the predetermined threshold value (SRth) and satisfies (Determination formula A) described above, the information processing device according to the present disclosure plays back the image frames fh to fi in FIG. 4A Recorded content in (4) described above as a playback image after the playback image frame fp in FIG. 4B Playback content in which the viewer/listener action is detected.

By executing such image replacement processing, the viewer/listener (user) 20 can view/listen, from a normal playback image, a switched image of a playback image of a performer reaction scene image without feeling uneasiness.

That is, the viewer/listener (user) 20 can view/listen, as a natural playback image, the reaction image in which the performer responds to the action by the viewer/listener (user) 20.

Moreover, after start of the playback of the replacement image, the information processing device according to the present disclosure also executes processing of switching the playback image from the replacement image back to the original playback image before the replacement.

At a time of the playback image switching also, the information processing device according to the present disclosure performs determination of similarity rates between the images subjected to the switching, and executes processing of switching the playback images at a timing when an image frame before and after the switching has a higher similarity rate.

A specific example of the image switching processing will be described with reference to FIGS. 5A and 5B.

Similarly to FIGS. 3A, 3B, 4A, and 4B, FIGS. 5A and 5B illustrate the following two pieces of content.

Figure 5:
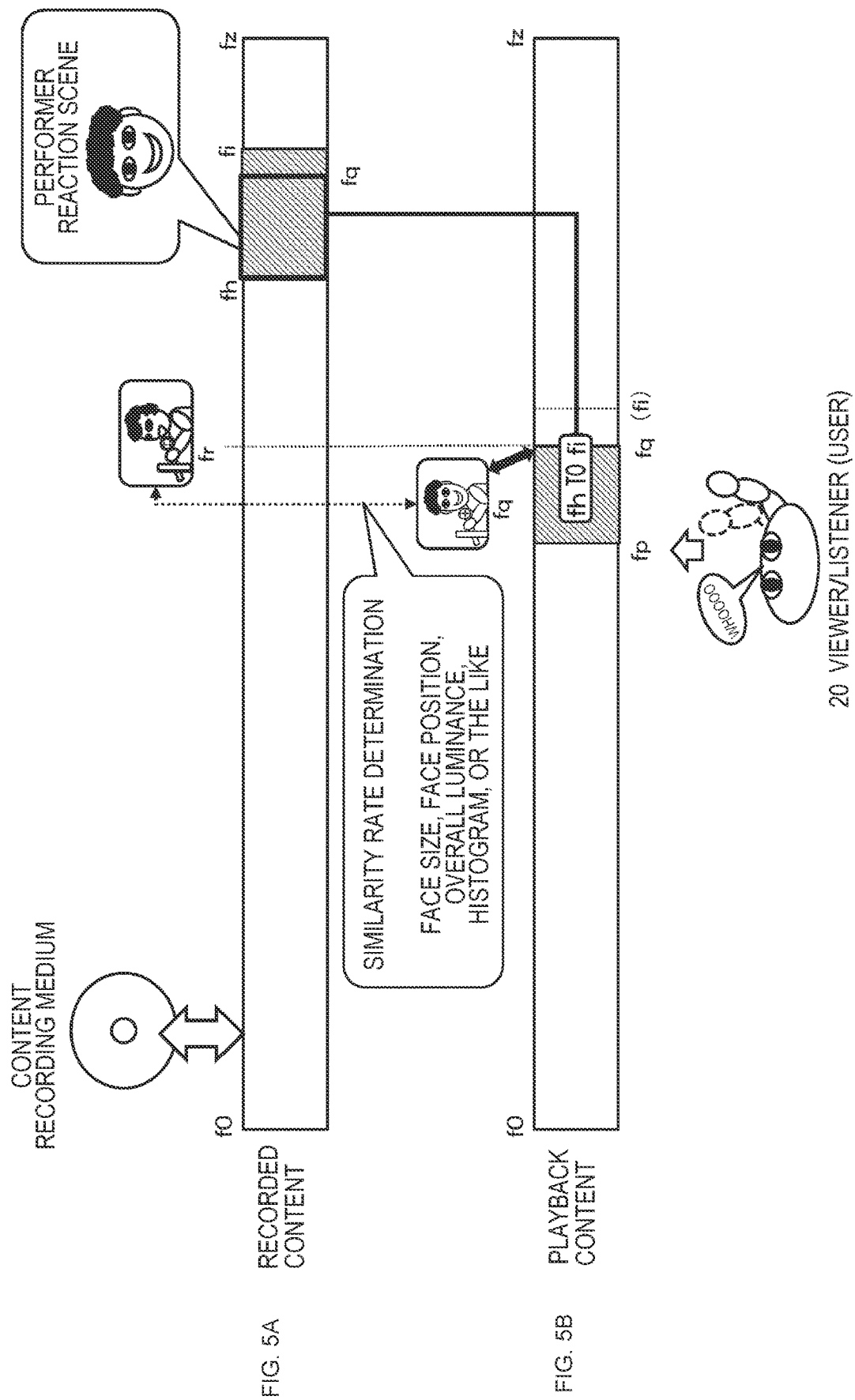
FIGS. 5A and 5B are diagrams describing the processing executed by the information processing device according to the present disclosure.

FIG. 5A Recorded content,
FIG. 5B Playback content,

FIG. 5A Recorded content is, for example, content recorded on a medium or the like, and FIG. 5B Playback content is content played back by utilizing recorded content, and is content viewed/listened by the viewer/listener (user) 20.

In (FIG. 5B) Playback content in FIGS. 5A and 5B, the playback image is replaced to the image frames fh to fi in FIG. 5A Recorded content in (4) described above as a playback image after the playback image frame fp in FIG. 5B Playback content in which the viewer/listener action is detected, and is played back.

When processing of ending the playback of the replacement image and switching the playback image from the replacement image back to the original playback image before the replacement is executed, the information processing device performs determination of similarity rates between the playback image frames of the replacement image and the original playback image frames.

Specifically, at a playback timing of the image frame of a replacement playback image immediately before playback time of the playback image frame fh of the replacement image illustrated in FIGS. 5A and 5B, and the replacement image frame, the playback image frame in FIG. 5A Recorded content before the replacement that was originally to be played back is compared, and a similarity rate between these image frames is analyzed.

The similarity rate analysis processing of the image frames is continuously executed after predetermined time passes after start of playback of replacement playback image frames fh to fi. For example, about five seconds after the playback of the replacement playback image frames fh to fi is started after the user action, similarity rate comparison processing of the image frames is started.

This is because the viewer/listener (user) is satisfied by viewing/listening the reaction of the performer in about five seconds. This time setting can be variously set.

After the playback of the replacement playback image frames fh to fi is started after the user action, the information processing device according to the present disclosure starts the similarity rate comparison processing of the image frames after, for example, five seconds, and if a similarity rate between an image frame of the replacement image and an image frame in FIG. 5A Recorded content before the replacement, the image frame being to be played back at that time, is equal to or higher than a predetermined value, ends the playback of the replacement image at the point of time, and executes processing of switching back to playback of the original image before the replacement, the original image being to be played back.

Image frame similarity rate determination at this time is executed utilizing the following four similarity rate evaluation indices, as described above with reference to FIGS. 4A and 4B.

(a) A face size of a face included in an image frame (SRfs)
(b) A face position of a face included in an image frame (SRfp)
(c) An overall luminance of an image frame (SRL)
(d) A pixel value histogram of an entire image frame (SRH)

After the above-described four types of similarity rate evaluation index values are calculated, as described above, a final similarity rate (Similarity Rate: SR) is calculated according to following (Mathematical formula 1).

$$SR=(w1 \times SRfs)+(w2 \times SRfp)+(w3 \times SRL)+(w4 \times SRH) \qquad \text{(Mathematical formula 1)}$$

In (Mathematical formula 1) described above, w1 to w4 are predetermined weighting factors.

According to (Mathematical formula 1) described above, there is calculated a similarity rate (SR) between an image frame of the replacement image and an image frame in FIG. 5A Recorded content before the replacement, the image frame being to be played back at that time.

Moreover, the calculated similarity rate (SR) is compared with the predetermined threshold value (SRth).

$$SR \geq SRth \qquad \text{(Determination formula B)}$$

In a case where similarity rate (SR) between an image frame of the replacement image and an image frame in FIG. 5A Recorded content before the replacement, the image frame being to be played back at that time, satisfies the above-described Determination formula B, processing of ending the image playback of the replacement image and switching back to image playback of FIG. 5A Recorded content before the replacement is executed.

The example illustrated in FIGS. 5A and 5B illustrate an example in which it is determined that one constituent image frame fq of the replacement playback image frames fh to fi has a high similarity rate to an original image frame that was originally to be played back at a playback time of the image frame fq, that is, an image frame fr in FIG. 5A Recorded image content, and satisfies (Determination formula B) described above.

In this case, after playback of the image frame fq in a middle of playback of the replacement playback image frames fh to fi, the information processing device executes playback image switching processing to change back to playback of the original image frame that was originally to be played back, that is, an image frame in FIG. 5A Recorded image content.

By executing such playback image switching processing, the viewer/listener (user) 20 can view/listen an image switched from the performer reaction scene to the original playback image without feeling uneasiness.

3. CONFIGURATION FOR UTILIZING PERFORMER REACTION IMAGE PREVIOUSLY STORED IN STORAGE UNIT

Next, a configuration for utilizing a performer reaction image previously stored in a storage unit will be described.

The processing of replacing a normal playback image with a performer reaction image and playing back the performer reaction image, as described with reference to FIGS. 3A, 3B, 4A, 4B, 5A, and 5B, can be executed by the information processing device executing similarity rate determination between images when detecting an action of the viewer/listener (user) 20, and utilizing a result of the similarity rate determination.

However, a replaceable performer reaction image frame may be previously extracted in units of each image frame of the normal playback content, and extracted data may be registered in the storage unit.

In a case where the image replacement processing is performed at a time of image playback, the registration data is acquired with reference to the storage unit, and the replacement processing is executed.

An example of data registered in the storage unit will be described with reference to FIG. 6.

FIG. 6 illustrates an example of data in which the following correspondence data is registered.

(1) Image frame number of playback image
(2) Number for performer reaction image frame for replacement (1) Image frame number of playback image (0, 1, . . . N . . . ) is an image frame number of the normal playback image, and is an image frame number in a case where FIG. 5A Recorded content described with reference to FIGS. 3A, 3B, 4A, 4B, 5A, and 5B are played back as FIG. 5B Playback content as is.

(2) Performer reaction image frame for replacement records a start image frame number (Start frame) and end image frame number (End frame) of performer reaction image frames replacing in a case where a user action (viewer/listener action) is detected in each image frame of the image frame numbers (0, 1, . . . N . . . ) in FIG. 5A Recorded content.

Note that (a/n) recorded as a start image frame number (Start frame) and end image frame number (End frame) of (2) Performer reaction image frame for replacement means absence of image for replacement.

Data such as Ps (N) or Pe (N) means that there is an image for replacement.

Registration data in an entry (1) Image frame number of playback image=N will be described.

In the entry (1) Image frame number of playback image=N, start image frame number (Start frame)=Ps (N) and end image frame number (End frame)=Pe (N) are recorded for (2) Performer reaction image frame for replacement.

This is data specifying that, in a case where a viewer/listener action is detected during playback of Image frame number of playback image=N, a subsequent playback image is replaced with performer reaction image frames Ps (N) to Pe (N) and is played back.

A specific replacement playback example will be described with reference to FIGS. 7A and 7B.

Similarly to FIGS. 3A, 3B, 4A, 4B, 5A, and 5B described above, FIGS. 7A and 7B illustrate the following two pieces of content.

FIG. 7A Recorded content,
FIG. 7B Playback content,

An image frame N in (FIG. 7B) Playback content illustrated in FIGS. 7A and 7B corresponds to a data entry N in FIG. 6.

It is assumed that, at a time point of playing back the image frame N in FIG. 7B Playback content, the viewer/listener (user) 20 performs a viewer/listener action (user action) such as cheering or waving a hand in support for the performer in the playback content.

In response to the detection of the viewer/listener action at the time point of playing back the image frame N in FIG. 7B Playback content, the information processing device acquires registration data corresponding to the image frame N with reference to the registration data stored in the storage unit, that is, the registration data illustrated in FIG. 6.

In the registration data corresponding to the image frame N, start image frame number (Start frame)=Ps (N) and end image frame number (End frame)=Pe (N) are recorded for (2) Performer reaction image frame for replacement.

The information processing device acquires the image frames Ps (N) to Pe (N) in FIG. 7A Recorded content on the basis of the registration data, replaces the image frames with the original playback image, and outputs the original playback image as a playback image after the image frame N in FIG. 7B Playback content.

Note that the replacement image frames Ps (N) to Pe (N) are image frames including performer reaction scenes, and are images determined to satisfy the specification of similarity rate previously described.

Thus, as a result of the image replacement processing, by viewing the performer reaction image, the viewer/listener (user) 20 can feel that the performer reacts to the viewer/listener action that is support from the viewer/listener (user) 20, and can further enjoy viewing/listening the content.

Thus, image replacement processing at a time of image playback can be smoothly performed by previously extracting a replaceable performer reaction image frame in units of each image frame of the normal playback content, registering extracted data in the storage unit.

Moreover, a replaceable performer reaction image frame stored in the storage unit may be registered as a different image frame corresponding to a type of an action of the user (viewer/listener action).

FIG. 8 is an example of registration data in which replaceable performer reaction image frames are registered as different image frames according to a type of user action.

The example in FIG. 8 illustrates the following four types of user action (viewer/listener action).

(2a) Support by voice
(2b) Handwaving
(2c) Hand pose (raising fist, or the like)
(2d) Throwing item Optimum performer reaction images for these various different user actions may be different, and the registration data illustrated in FIG. 8 is registration data having a configuration that enables processing of playback with replacement of different performer reaction images according to the user action.

By performing image replacement by utilizing registration data in this manner, the user (viewer/listener) can view/listen a natural reaction image of the performer in response to various actions of the user.

4. CONFIGURATION EXAMPLES OF INFORMATION PROCESSING DEVICE AND INFORMATION PROCESSING SYSTEM

Next, configuration examples of the information processing device and information processing system according to the present disclosure that execute the above-described processing will be described.

Although the above-described image replacement processing can be executed independently in a content playback device for example, the image replacement processing can also be executed in a content distribution server, for example.

Hereinafter, these two types of configuration examples will be sequentially described.

First, a configuration example in which the above-described image replacement processing is independently executed in the content playback device will be described with reference to FIG. 9.

Figure 9:
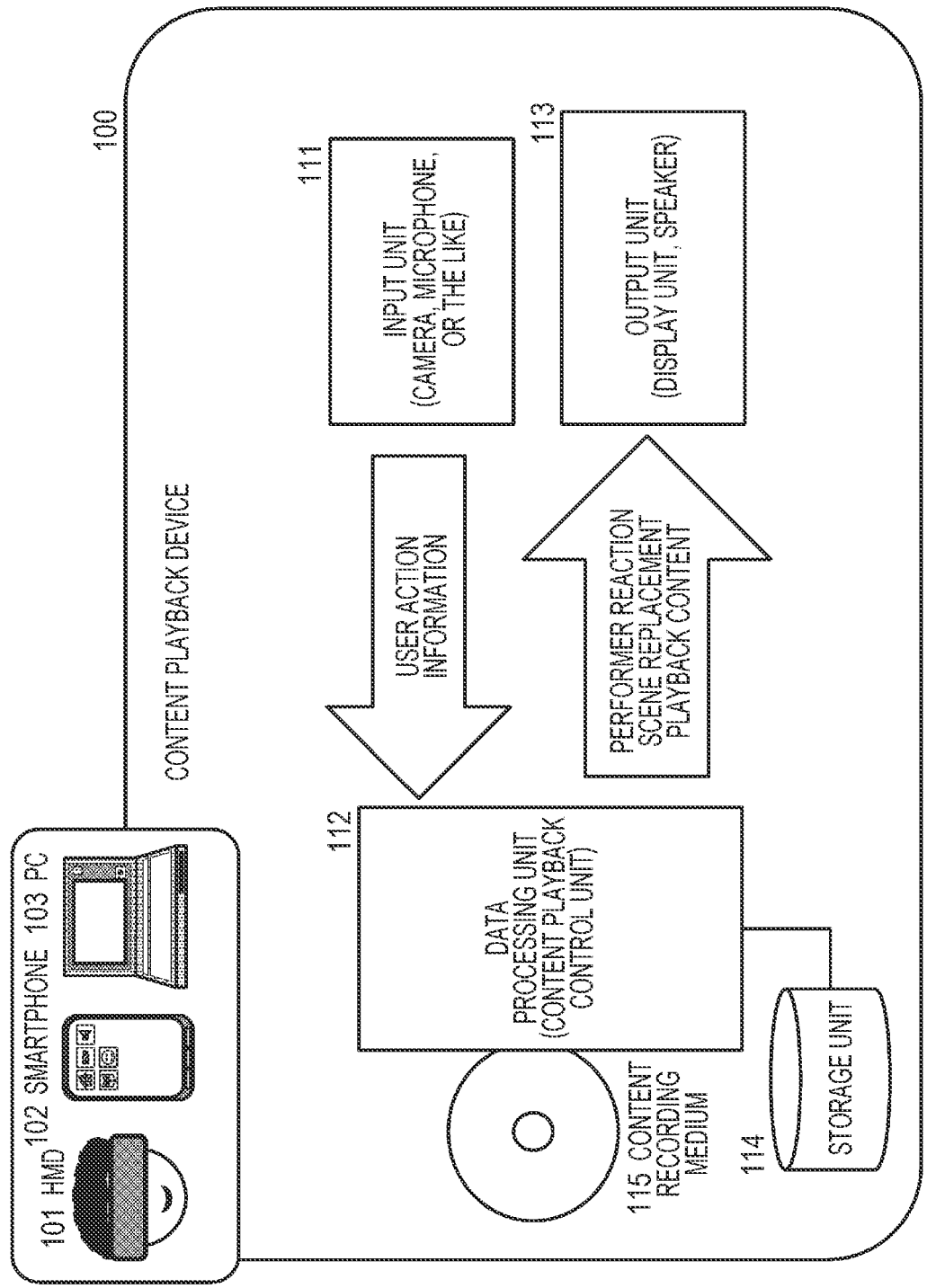
FIG. 9 is a diagram describing a configuration example of the information processing device according to the present disclosure.

FIG. 9 illustrates a configuration example of a content playback device 100.

The content playback device 100 includes, for example, a head mount display (HMD) 101, a smart phone (smartphone) 102, a PC 103, or the like.

As illustrated in FIG. 9, the content playback device 100 includes an input unit 111, a data processing unit (content playback control unit) 112, an output unit 113, and a storage unit 114. Note that these indicate main components of the content playback device 100, and the content playback device 100 has various other components.

The input unit 111 includes, for example, a camera, a microphone, or the like, and is utilized as an input unit of an action of the user (viewer/listener action).

The data processing unit (content playback control unit) 112 plays back, for example, content stored in a content recording medium 115. Note that the content may be content input from an unillustrated external device or external server.

The data processing unit (content playback control unit) 112 executes playback content replacement processing according to the user action input from the input unit 111. That is, processing of replacing the normal playback image with a performer reaction image and playing back the performer reaction image is performed according to the user action.

Note that, in a case where this image replacement processing is performed, the data processing unit (content playback control unit) 112 executes the above-described similarity rate analysis between the image frames, selects a replacement image that satisfies the predetermined similarity rate, and executes replacement processing.

The output unit 113 includes a display unit that outputs a playback image of content including a replacement image frame generated by the data processing unit (content playback control unit) 112, a speaker that performs audio output, or the like.

The storage unit 114 stores, for example, registration data described above with reference to FIGS. 6 and 8, that is, the registration data in which replacement image frames corresponding to each playback image frame is registered.

Note that the storage unit 114 also stores a program corresponding to various kinds of data processing executed by the content playback device 100, a parameter applied to data processing, or the like.

Next, a configuration example in which the above-described image replacement processing is executed in the content distribution server will be described with reference to FIG. 10.

Figure 10:
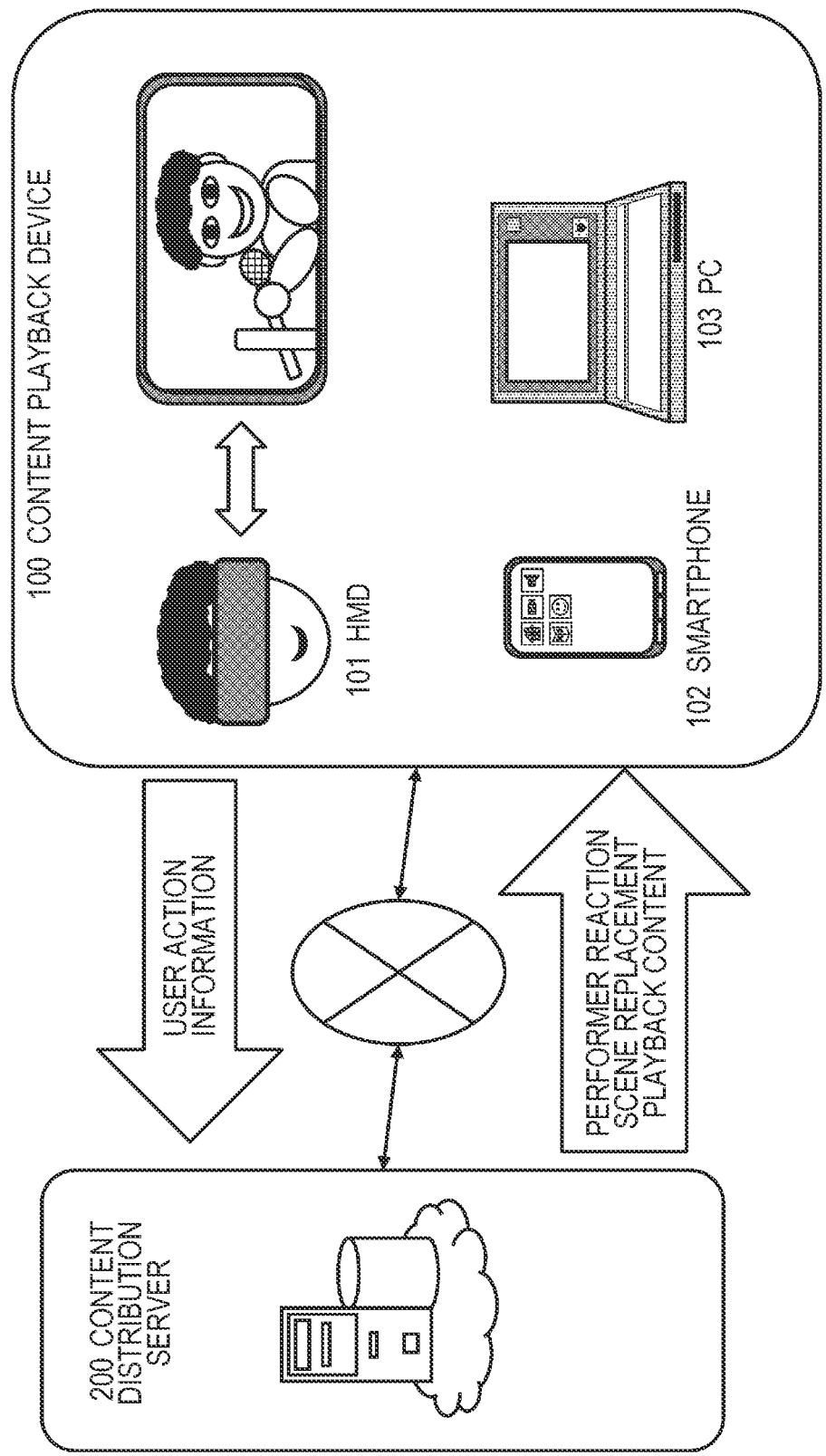
FIG. 10 is a diagram describing a configuration example of an information processing system according to the present disclosure.

FIG. 10 illustrates a content playback device 100 and a content distribution server 200.

The content playback device 100 and the content distribution server 200 can communicate with each other via a network.

The content distribution server 200 distributes content to the content playback device 100 via the network.

The content playback device 100 plays back the content received from the content distribution server 200.

Here, the above-described image replacement processing is executed by the content distribution server 200.

The content distribution server 200 distributes content to the content playback device 100, and the content playback device 100 outputs distribution content via the display unit or speaker as an output unit.

An input unit such as a camera or microphone that acquires a user action is also provided on a side close to the content playback device 100.

The content playback device 100 transmits user action information input via the input unit such as the camera or microphone to the content distribution server 200 via the network.

According to the user action information received from the content playback device 100, the content distribution server 200 executes processing of replacing a part of the distribution content with an image frame including a performer reaction image, and transmits the image frame to the content playback device 100.

With this configuration, the content playback device 100 can view/listen the performer reaction image replacement data transmitted from the content distribution server 200.

The system configuration illustrated in FIG. 10 corresponds to a configuration in which a data processing unit 112 of the content playback device 100 illustrated in FIG. 9 is provided in the content distribution server 200, and the input unit 111 and an output unit 114 are provided on a side close to the content playback device 100.

Note that, in a system including the content playback device 100 and content distribution server 200 illustrated in FIG. 10, the content distribution server 200 may not replace the image frames, the content distribution server 200 may distribute a recorded image as is, and a side close to the content playback device 100 may replace the image frames in response to the user action.

In this case, the content playback device 100 performs processing to which the configuration described above with reference to FIG. 9 is applied.

Next, a specific configuration example of the input unit for a user action (viewer/listener action) will be described with reference to FIG. 11.

Figure 11:
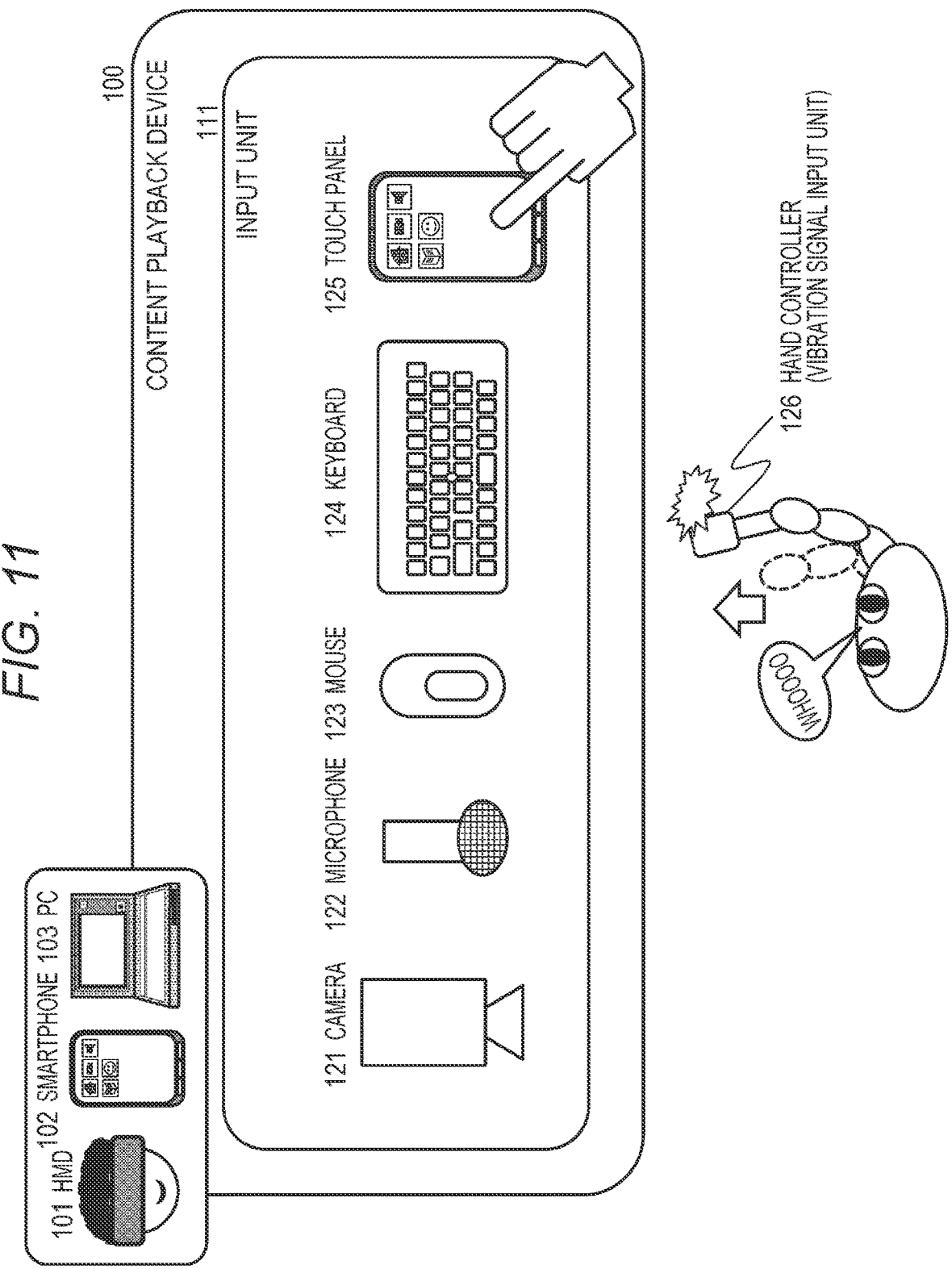
FIG. 11 is a diagram describing a configuration example of an input unit.

FIG. 11 is a diagram illustrating a specific configuration example of the input unit 111 of the content playback device 100.

As illustrated in FIG. 11, for example, the input unit 111 of the content playback device 100 includes a camera 121, a microphone 122, a mouse 123, a keyboard 124, a touch panel 125, a hand controller (vibration signal input unit) 126, and the like.

All of these components are used for user action input processing of the viewer/listener (user) who is a content viewer/listener.

The camera 121 captures an image of a behavior of the viewer/listener (user), for example, various behaviors of the user such as waving a hand, raising a fist, swinging a body, or dancing.

The microphone 122 acquires sound, such as voice of the viewer/listener (user) calling.

The mouse 123, the keyboard 124, or the touch panel 125 is used by the user to input various messages, input designation information of a specific region of an image, or the like. Alternatively, the mouse 123, the keyboard 124, or the touch panel 125 is also utilized for processing of specifying various items displayed along with a content display screen and throwing the item, or the like.

The hand controller (vibration signal input unit) 126 is held by a hand of the user and shaken to input vibration information.

Various pieces of user action information input from the input unit 111 having these various configurations are input to the data processing unit 112 illustrated in FIG. 9 or to the content distribution server 200 illustrated in FIG. 10.

The data processing unit 112 illustrated in FIG. 9 or the content distribution server 200 illustrated in FIG. 10 executes processing of selecting an image frame including a performer reaction image on the basis of the user action information input from the input unit 111, and executes replacement processing.

Next, a configuration example of the data processing unit 112 that executes image replacement processing will be described with reference to FIG. 12.

Figure 12:
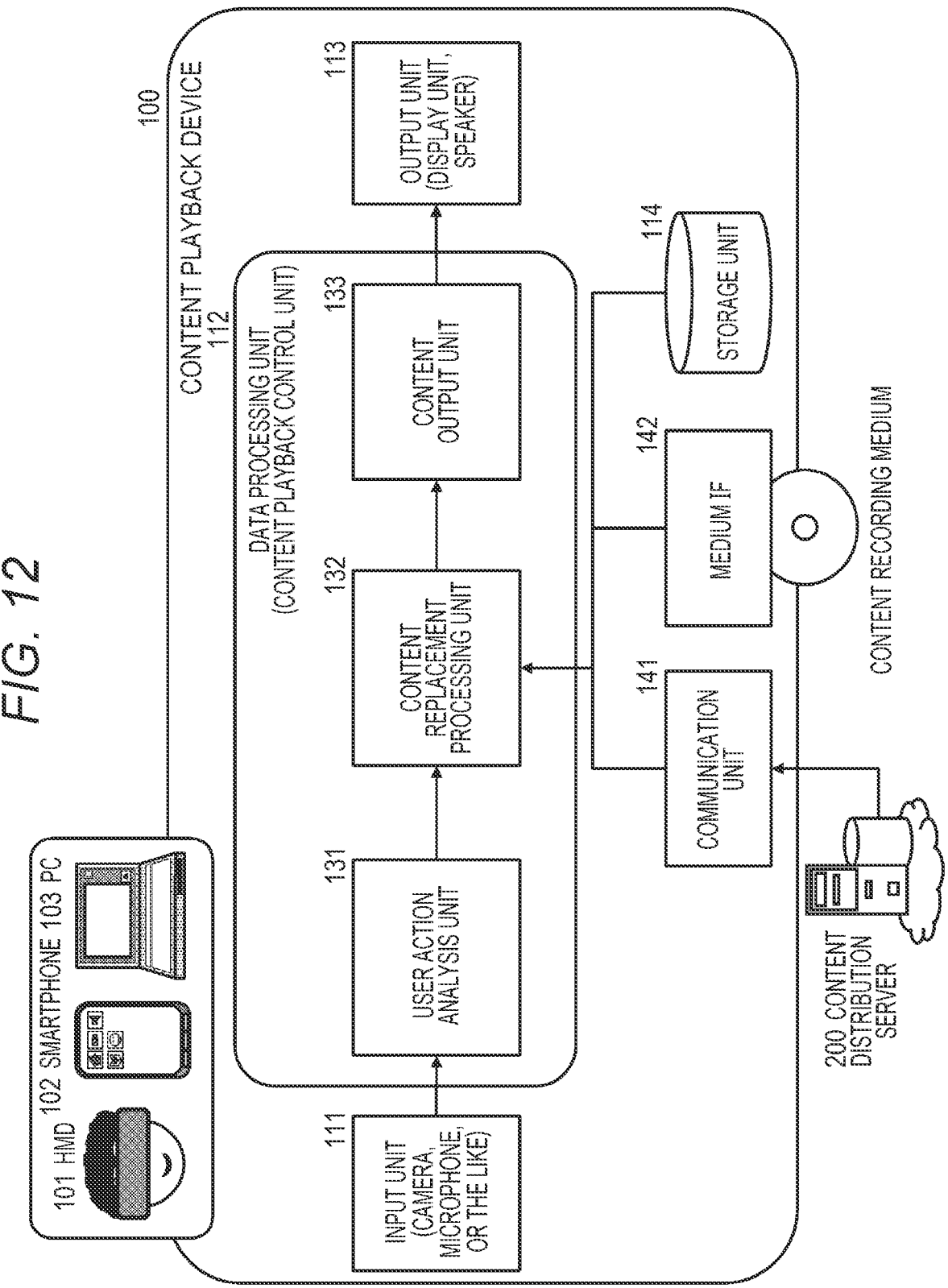
FIG. 12 is a diagram describing a configuration and processing of a data processing unit of a content playback device.

FIG. 12 illustrates a configuration example of the data processing unit 112 in a case where content replacement is performed on a side close to the content playback device 100.

As illustrated in FIG. 12, the data processing unit (content playback control unit) 112 of the content playback device 100 has a user action analysis unit 131, a content replacement processing unit 132, and a content output unit 133.

The user action analysis unit 131 analyzes the user action information input from the input unit 111, and analyzes whether or not the input user action is an action on a performer in the playback content.

Moreover, as described with reference to FIG. 8, in a case where a setting is such that replacement content differs according to a type of the user action, the type of the user action is also analyzed.

A result of the analysis by the user action analysis unit 131, that is, (a) determination information as to whether or not the user action on the performer in the playback content has been detected, is input to the content replacement processing unit 132, and in addition to the information (a) described above, type information of the user action on the performer in the playback content is input to the content replacement processing unit 132, as necessary.

The content replacement processing unit 132 discriminates the image frame in which the user action on the performer in the playback content has occurred, and retrieves a performer reaction image frame similar to the discriminated user action occurrence image frame from the content.

Note that it is assumed that the image frame in which the user action has occurred is, for example, a playback frame at a time point of input of information, from the user action analysis unit 131, indicating that the user action on the performer has been detected.

As described above, the content replacement processing unit 132 determines a similarity rate between the playback image frame at the time point when the user action is detected and the performer reaction image frame to be placed to.

Specifically, as described above, similarity rate determination utilizing the following similarity rate determination index values is executed.

(a) A face size of a face included in an image frame (SRfs)
(b) A face position of a face included in an image frame (SRfp)
(c) An overall luminance of an image frame (SRL)
(d) A pixel value histogram of an entire image frame (SRH)

Moreover, a similarity rate calculated on the basis of each of the index values of the (a) to (d) described above is compared with a predetermined threshold value, a performer reaction image frame section having an image frame of which the calculated similarity rate is equal to or higher than the threshold value as a start image frame is selected as a replacement image, and image replacement processing is executed.

The replacing image replaced in the content replacement processing unit 132 is output to the output unit 114 via the content output unit 133.

Note that the content replacement processing unit 132 also executes processing of switching from playback of the performer reaction image to playback of the original normal playback image.

When executing this processing also, the content replacement processing unit 132 performs determination of similarity rates between the playback image frames of the replacement image and the original playback image frames.

This processing is the processing described above with reference to FIGS. 5A and 5B.

Furthermore, in the image replacement processing, the content replacement processing unit 132 may acquire the registration data described above with reference to FIGS. 6, 7A, 7B, and 8 from the storage unit 114, and execute image replacement by utilizing the registration data.

The storage unit 114 includes correspondence data to each of the following data (1) and (2).

(1) Image frame number of playback image
(2) Number for performer reaction image frame for replacement The content replacement processing unit 132 may acquire registration data from the storage unit 114, acquire a replacement image frame number corresponding to an action occurrence frame of the user action, acquire an image of the acquired frame number from the recorded content, and perform replacement processing.

Note that the recorded content can be acquired from the content recording medium via a medium IF 142 illustrated in FIG. 12.

Alternatively, the recorded content can be acquired from an external apparatus such as the content distribution server 200, for example, via a communication unit 141.

Next, a configuration and processing of a data processing unit (content distribution control unit) 210 in a case where the content distribution server 200 replaces content will be described with reference to FIG. 13.

Figure 13:
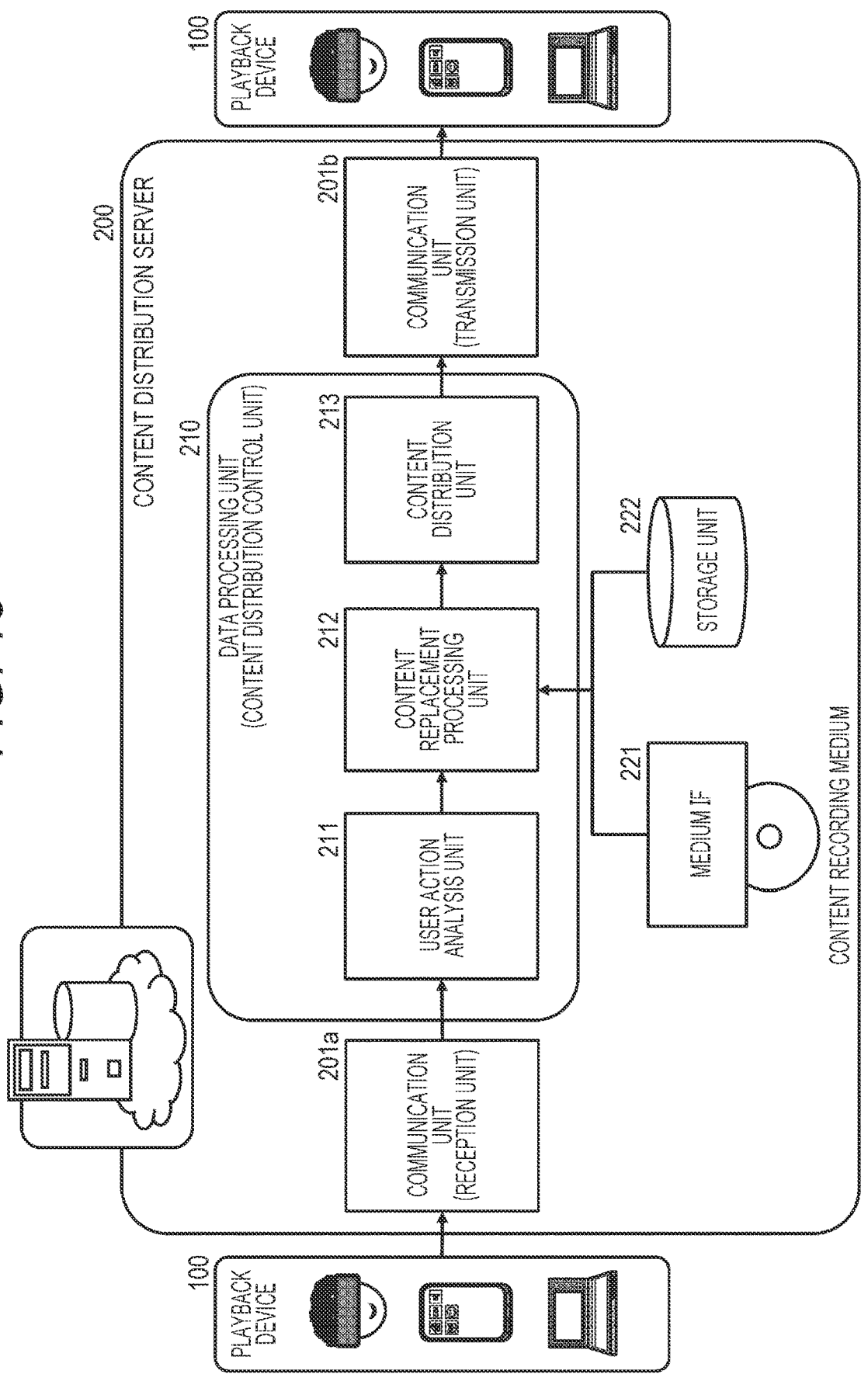
FIG. 13 is a diagram describing a configuration and processing of a data processing unit of a content distribution server.

FIG. 13 illustrates a configuration example of the data processing unit (content distribution control unit) 210 of the content distribution server 200 in a case where content replacement is performed on a side close to the content distribution server 200.

As illustrated in FIG. 13, the data processing unit (content distribution control unit) 210 of the content distribution server 200 has a user action analysis unit 211, a content replacement processing unit 212, and a content distribution unit 213.

The user action analysis unit 211 analyzes the user action information input from the content playback device 100 via a network and a communication unit 201a, and analyzes whether or not the input user action is an action on a performer in the playback content.

Moreover, as described with reference to FIG. 8, in a case where a setting is such that replacement content differs according to a type of the user action, the type of the user action is also analyzed.

A result of the analysis by the user action analysis unit 211, that is,
- (a) determination information as to whether or not the user action on the performer in the playback content has been detected, is input to the content replacement processing unit 212, and in addition to the information (a) described above, type information of the user action on the performer in the playback content is input to the content replacement processing unit 212, as necessary.

The content replacement processing unit 212 discriminates the image frame in which the user action on the performer in the playback content has occurred, and retrieves a performer reaction image frame similar to the discriminated user action occurrence image frame from the content.

Note that it is assumed that the image frame in which the user action has occurred is, for example, a playback frame at a time point of input of information, from the user action analysis unit 211, indicating that the user action on the performer has been detected.

As described above, the content replacement processing unit 212 determines a similarity rate between the playback image frame at the time point when the user action is detected and the performer reaction image frame to be placed to.

Specifically, as described above, similarity rate determination utilizing the following similarity rate determination index values is executed.
- (a) A face size of a face included in an image frame (SRfs)
- (b) A face position of a face included in an image frame (SRfp)
- (c) An overall luminance of an image frame (SRL)
- (d) A pixel value histogram of an entire image frame (SRH)

Moreover, a similarity rate calculated on the basis of each of the index values of the (a) to (d) described above is compared with a predetermined threshold value, a performer reaction image frame section having an image frame of which the calculated similarity rate is equal to or higher than the threshold value as a start image frame is selected as a replacement image, and image replacement processing is executed.

The replacing image replaced in the content replacement processing unit 212 is distributed from the content distribution unit 213 to the content playback device 100 via a communication unit 201b and a network.

Note that the content replacement processing unit 212 also executes processing of switching from playback of the performer reaction image to playback of the original normal playback image.

When executing this processing also, the content replacement processing unit 212 performs determination of similarity rates between the playback image frames of the replacement image and the original playback image frames.

This processing is the processing described above with reference to FIGS. 5A and 5B.

Furthermore, in the image replacement processing, the content replacement processing unit 212 may acquire the registration data described above with reference to FIGS. 6, 7A, 7B, and 8 from a storage unit 222, and execute image replacement by utilizing the registration data.

The storage unit 222 includes correspondence data to each of the following data (1) and (2).
- (1) Image frame number of playback image
- (2) Number for performer reaction image frame for replacement The content replacement processing unit 212 may acquire registration data from the storage unit 222, acquire a replacement image frame number corresponding to an action occurrence frame of the user action, acquire an image of the acquired frame number from the recorded content, and perform replacement processing.

Note that the recorded content can be acquired from the content recording medium via a medium IF 221 illustrated in FIG. 13.

5. PROCESSING SEQUENCE OF CONTENT REPLACEMENT PROCESSING EXECUTED BY INFORMATION PROCESSING DEVICE

Next, with reference to the flowcharts in FIG. 14 and the subsequent drawings, processing sequences of content replacement processing executed by the information processing device according to the present disclosure will be described.

Note that the information processing device that executes the content replacement processing is the content playback device 100 having the configuration illustrated in FIG. 12 or the content distribution server 200 having the configuration illustrated in FIG. 13.

Figure 14:
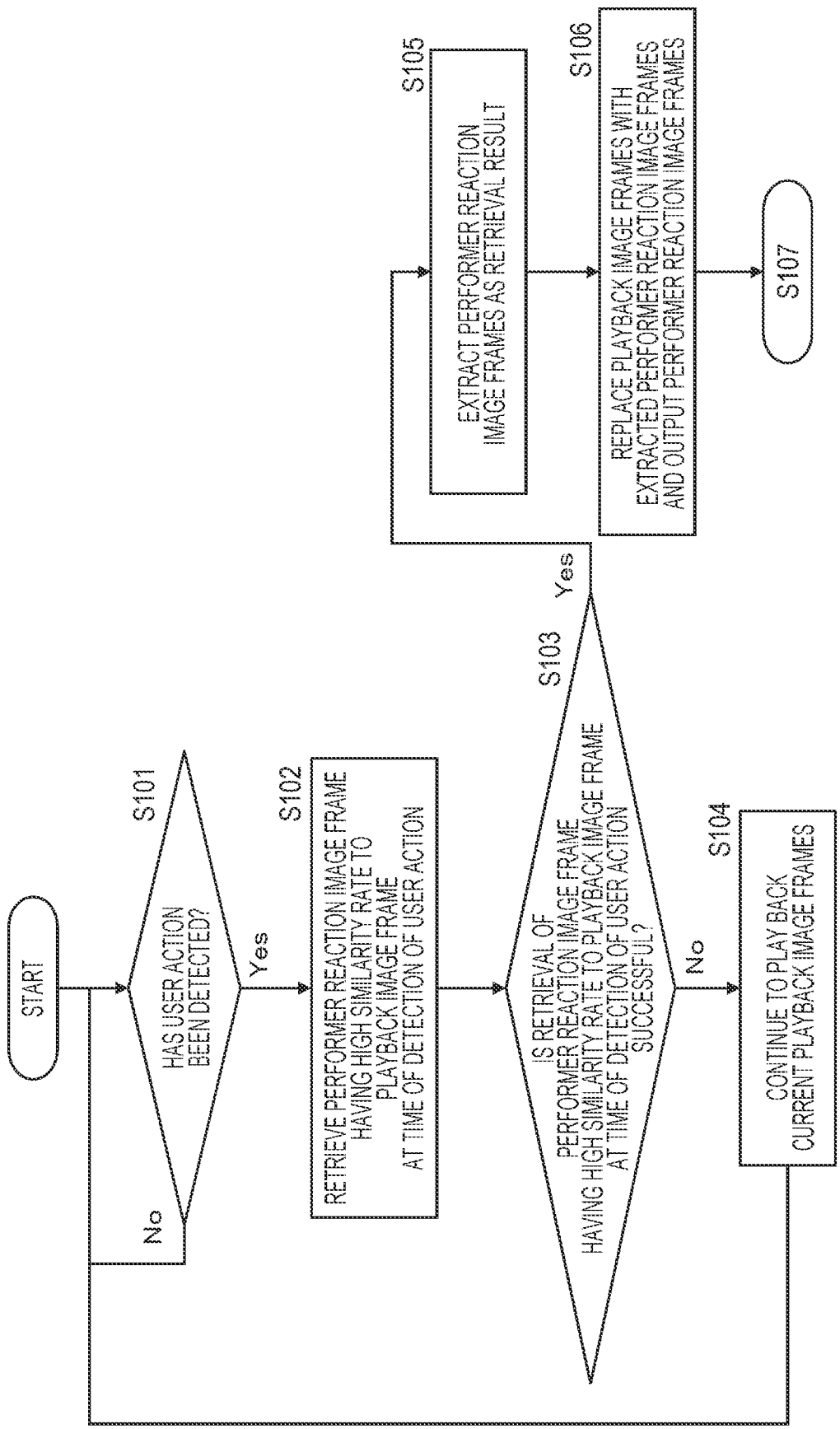
FIG. 14 is a diagram illustrating a flowchart describing a sequence of processing executed by the information processing device according to the present disclosure.
Figure 15:
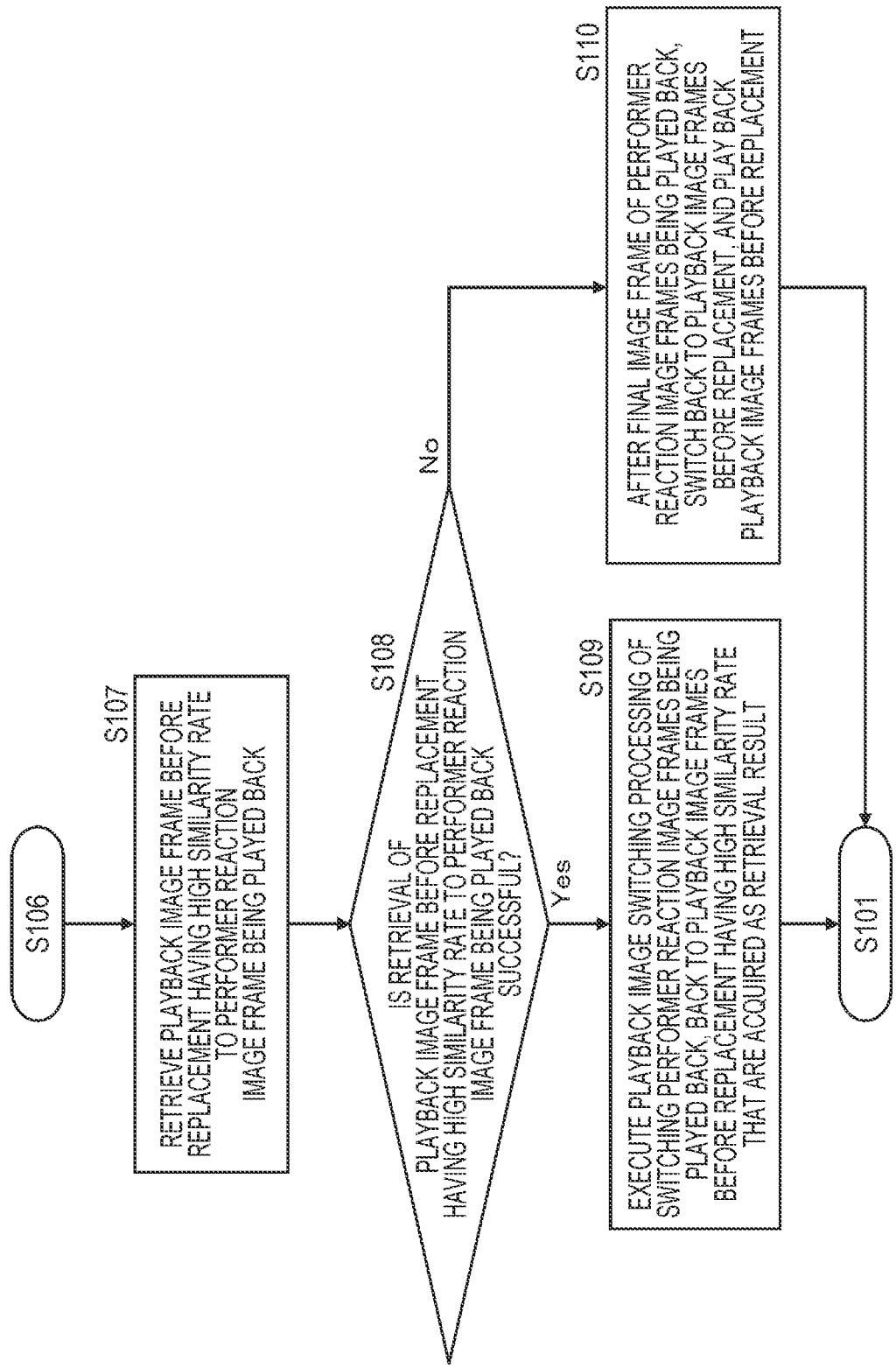
FIG. 15 is a diagram illustrating a flowchart describing the sequence of the processing executed by the information processing device according to the present disclosure.

The flowchart illustrated in FIGS. 14 and 15 is a flowchart for describing a processing sequence in which a data processing unit of the information processing device executes, in response to detection of a user action, processing of retrieving replacement performer reaction image frames for replacement from recorded content, and performing replacement.

Figure 16:
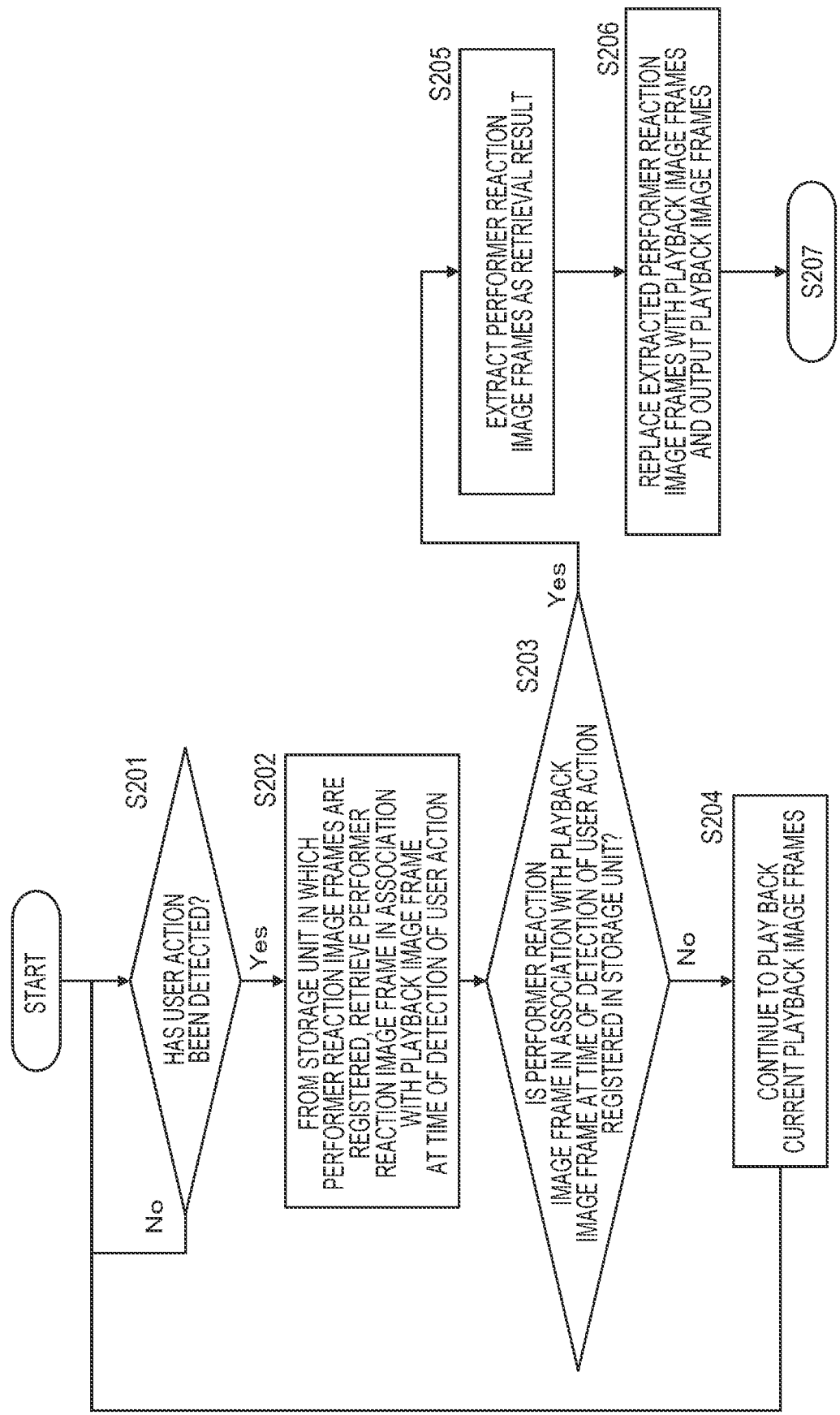
FIG. 16 is a diagram illustrating a flowchart describing a sequence of processing executed by the information processing device according to the present disclosure.

Furthermore, the flowchart illustrated in FIGS. 16 and 17 is a flowchart describing a processing sequence for executing processing of deciding performer reaction image frames for replacement by utilizing registration data stored in the storage unit described above with reference to FIGS. 6, 7A, 7B, and 8, that is, registration data including correspondence data to each of the following (1) and (2), and performs processing of replacement.
- (1) Image frame number of playback image
- (2) Number for performer reaction image frame for replacement First, with reference to FIGS. 14 and 15, there will be described a processing sequence in which the data processing unit of the information processing device executes, in response to detection of a user action, processing of retrieving replacement performer reaction image frames for replacement from recorded content, and performing replacement.

Note that processing according to the following flowcharts is executed in the data processing unit of the information processing device. The data processing unit includes a CPU having a program execution function, and can execute processing according to a flow according to a program stored in the storage unit.

Hereinafter, processing in each step of the flow illustrated in FIGS. 14 and 15 will be described.

(Step S101)

First, in Step S101, the data processing unit of the information processing device determines whether or not a user action has been detected.

This processing is executed by the user action analysis unit illustrated in FIGS. 12 and 13. The user action analysis unit analyzes user action information acquired by the input unit of the content playback device, and analyzes whether or not the input user action is an action on a performer in the playback content.

In a case where it is determined that the input user action is an action on the performer in the playback content, the processing proceeds to Step S102.

(Steps S102 to S103)

When it is determined in Step S101 that the user action on the performer in the playback content has been detected, then, in Step S102, the data processing unit retrieves a performer reaction image frame having a high similarity rate to the playback image frame at a time of detection of the user action.

This processing is processing executed by the content replacement processing unit illustrated in FIGS. 12 and 13.

The content replacement processing unit retrieves a performer reaction image frame having a high similarity rate to the playback image frame at the time of detection of the user action.

As described above, the following similarity rate determination index values are utilized for determination of a similarity rate of images.

(a) A face size of a face included in an image frame (SRfs)
(b) A face position of a face included in an image frame (SRfp)
(c) An overall luminance of an image frame (SRL)
(d) A pixel value histogram of an entire image frame (SRH)

After the above-described four types of similarity rate evaluation index values are calculated, a final similarity rate (Similarity Rate: SR) is calculated according to following (Mathematical formula 1).

$$SR = (w1 \times SRfs) + (w2 \times SRfp) + (w3 \times SRL) + (w4 \times SRH) \quad \text{(Mathematical formula 1)}$$

In (Mathematical formula 1) described above, w1 to w4 are predetermined weighting factors.

An image having a highest similarity rate calculated according to (Mathematical formula 1) described above is selected, the similarity rate of the selected image is compared with a predetermined threshold value, and a performer reaction image frame having an image frame having a similarity rate equal to or higher than the threshold value as a start image frame is selected as a replacement image.

Thus, in a case where retrieval of the image frame for replacement having the similarity rate equal to or higher than the threshold value is successful, that is, in a case where the retrieval of the performer reaction image frame is successful, the determination in Step S103 is Yes, and the processing proceeds to Step S105.

Meanwhile, in a case where retrieval of the image frame for replacement having the similarity rate equal to or higher than the threshold value fails, that is, in a case where the retrieval of the performer reaction image frame fails, the determination in Step S103 is No, and the processing proceeds to Step S104.

(Step S104)

In Steps S102 to S103, in a case where retrieval of the image frame for replacement having the similarity rate equal to or higher than the threshold value fails, that is, in a case where the retrieval of the performer reaction image frame fails, the determination in Step S103 is No, and the processing proceeds to Step S104.

In Step S104, processing of playing back the normal playback image, that is, the recorded content as is continued without performing the image replacement processing.

After this processing, the processing returns to Step S101 and is continued. Note that the processing in Step S101 and the subsequent steps is repeatedly executed until the content playback ends.

(Step S105)

Meanwhile, in processing in Steps S102 to S103, in a case where retrieval of the image frame for replacement having the similarity rate equal to or higher than the threshold value is successful, that is, in a case where the retrieval of the performer reaction image frame is successful, the determination in Step S103 is Yes, and the processing proceeds to Step S105.

In Step S105, the data processing unit acquires image frames including performer reaction image scenes obtained as a result of the retrieval in Steps S102 to S103.

(Step S106)

Next, in Step S106, the data processing unit replaces the image frames of the normal playback image (=recorded content) currently being played back with image frames including the performer reaction image scenes acquired in Step S105, and outputs the image frames including the performer reaction image scenes.

(Steps S107 to S108)

The processing in Step S107 and the subsequent steps corresponds to processing of switching the playback of the performer reaction image back to playback of the original normal image.

First, in Step S107, the data processing unit retrieves a playback image frame before the replacement, the playback image frame having a high similarity rate to the performer reaction image frame currently being played back.

This processing is the processing described above with reference to FIGS. 5A and 5B.

When processing of ending the playback of the replacement image and switching the playback image from the replacement image back to the original playback image before the replacement is executed, the data processing unit of the information processing device performs determination of similarity rates between the playback image frames of the replacement image and the original playback image frames.

Image frame similarity rate determination at this time is executed utilizing the following four similarity rate evaluation indices, similarly to the similarity rate determination processing in Step S102 described above.

(a) A face size of a face included in an image frame (SRfs)
(b) A face position of a face included in an image frame (SRfp)
(c) An overall luminance of an image frame (SRL)
(d) A pixel value histogram of an entire image frame (SRH)

After the above-described four types of similarity rate evaluation index values are calculated, as described above, a final similarity rate (Similarity Rate: SR) is calculated according to following (Mathematical formula 1).

$$SR = (w1 \times SRfs) + (w2 \times SRfp) + (w3 \times SRL) + (w4 \times SRH) \quad \text{(Mathematical formula 1)}$$

In (Mathematical formula 1) described above, w1 to w4 are predetermined weighting factors.

According to (Mathematical formula 1) described above, there is calculated a similarity rate (SR) between an image frame of the replacement image and an image frame in FIGS. 3A, 4A, 5A, and 7A Recorded content before the replacement, the image frame being to be played back at that time.

Moreover, the calculated similarity rate (SR) is compared with the predetermined threshold value (SRth).

SR≥SRth                   (Determination formula B)

In a case where there is detected an image frame, in which a similarity rate (SR) between an image frame of the replacement image and the image frame in FIGS. 3A, 4A, 5A, and 7A Recorded content before the replacement achieves a similarity rate satisfying the above-described determination formula B, the image frame being to be played back at that time, the determination in Step S108 is Yes, and the processing proceeds to Step S109.

Meanwhile, in a case where an image frame having a similarity rate satisfying the above-described determination formula B is not detected, the determination in Step S108 is No, and the processing proceeds to Step S110.

(Step S109)

In the processing in Steps S107 to S108, in a case where there is detected an image frame, in which a similarity rate (SR) between an image frame of the replacement image and the image frame in FIGS. 3A, 4A, 5A, and 7A Recorded content before the replacement achieves a similarity rate satisfying the above-described determination formula B, the image frame being to be played back at that time, the determination in Step S108 is Yes, and the processing proceeds to Step S109.

In this case, in Step S109, the data processing unit of the information processing device executes playback image switching processing of switching from the performer reaction image frames being played back, back to the playback image frames before the replacement having a high similarity rate that are acquired as a result of the retrieval in Step S107.

(Step S110)

Meanwhile, in the processing in Steps S107 to S108, in a case where there is detected no image frame, in which a similarity rate (SR) between an image frame of the replacement image and the image frame in FIGS. 3A, 4A, 5A, and 7A Recorded content before the replacement achieves a similarity rate satisfying the above-described determination formula B, the image frame being to be played back at that time, the determination in Step S108 is No, and the processing proceeds to Step S110.

In this case, in Step S110, the data processing unit of the information processing device performs image switching processing of continuously playing back the performer reaction image frames being played back, and after a final frame of the performer reaction image frames being played back, switching from the performer reaction image frames back to the playback image frames before the replacement, and playing back the playback image frames before the replacement.

Next, processing of deciding and replacing to performer reaction image frames for replacement by using the registration data stored in the storage unit will be described with reference to a flowchart illustrated in FIGS. 16 and 17.

The registration data stored in the storage unit is registration data stored in the storage unit described above with reference to FIGS. 6, 7A, 7B, and 8, that is, registration data including correspondence data to each of the following (1) and (2).

(1) Image frame number of playback image
(2) Number for performer reaction image frame for replacement Hereinafter, processing in each step of the flow illustrated in FIGS. 16 and 17 will be described.

(Step S201)

First, in Step S201, the data processing unit of the information processing device determines whether or not a user action has been detected.

This processing is executed by the user action analysis unit illustrated in FIGS. 12 and 13. The user action analysis unit analyzes user action information acquired by the input unit of the content playback device, and analyzes whether or not the input user action is an action on a performer in the playback content.

In a case where it is determined that the input user action is an action on the performer in the playback content, the processing proceeds to Step S202.

(Steps S202 to S203)

When it is determined in Step S201 that the user action on the performer in the playback content has been detected, then, in Steps S202 to S203, the data processing unit retrieves registration data in the storage unit, and determines whether or not there is a performer reaction image frame registered in association with the playback image frame at the time of detection of the user action.

The registration data stored in the storage unit is registration data described above with reference to FIGS. 6, 7A, 7B, and 8, that is, registration data including correspondence data to each of the following (1) and (2).

(1) Image frame number of playback image
(2) Number for performer reaction image frame for replacement In Steps S202 to S203, the data processing unit retrieves registration data in the storage unit, and determines whether or not there is a performer reaction image frame registered in association with the playback image frame at a time of detection of the user action.

In a case where a performer reaction image frame registered in association with the playback image frame at the time of detection of the user action is detected, the determination in Step S203 is Yes, and the processing proceeds to Step S205.

Meanwhile, in a case where a performer reaction image frame registered in association with the playback image frame at the time of detection of the user action is not detected, the determination in Step S203 is No, and the processing proceeds to Step S204.

(Step S204)

In steps S202 to S203, in a case where a performer reaction image frame registered in association with the playback image frame at the time of detection of the user action is not detected, the determination in Step S203 is No, and the processing proceeds to Step S204.

In Step S204, processing of playing back the normal playback image, that is, the recorded content as is continued without performing the image replacement processing.

After this processing, the processing returns to Step S201 and is continued. Note that the processing in Step S201 and the subsequent steps is repeatedly executed until the content playback ends.

(Step S205)

Meanwhile, in the processing in Steps S202 to S203, in a case where a performer reaction image frame registered in association with the playback image frame at the time of detection of the user action is detected, the determination in Step S203 is Yes, and the processing proceeds to Step S205.

In Step S205, the data processing unit acquires the performer reaction image frames obtained as a result of the registration data retrieval from the storage unit in Steps S202 to S203.

(Step S206)

Next, in Step S206, the data processing unit replaces the image frames of the normal playback image (=recorded content) currently being played back with image frames including the performer reaction image scenes acquired in Step S205, and outputs the image frames.

(Step S207)

The processing in Step S207 and the subsequent steps corresponds to processing of switching the playback of the performer reaction image back to playback of the original normal image.

First, in Step S207, the data processing unit determines whether or not a last image frame of the performer reaction image frames currently being played back has been reached.

In a case where it is determined that the last image frame has been reached, the processing proceeds to Step S208.

(Step S208)

In a case where it is determined in Step S207 that the last image frame of the performer reaction image frames currently being played back has been reached, the processing proceeds to Step S208.

In this case, in Step S208, the data processing unit of the information processing device executes playback image switching processing of switching from the performer reaction image frames being played back, back to the playback image frames before the replacement.

6. OTHER EMBODIMENTS

Next, other embodiments will be described.

In the above-described embodiment, a configuration has been described in which a performer reaction image frame having a high similarity rate to the playback image is retrieved in response to detection of the user action, and performer reaction image frames obtained as a result of the retrieval replace normal playback image frames being played back are played back.

Although this embodiment is image replacement processing in units of image frames, only a part of an image, such as only a face image region for example, may be replaced.

For example, the processing is processing of replacing only a face region of the performer with a face image including a reaction. Regions other than the face image are not replaced, and the normal playback image is played back.

That is, processing of generating and playing back a composite image of the normal playback image and a reacting face image may be performed.

Note that, in a case where this processing is performed, it is necessary to select, as a performer reaction face image utilized for replacement, a face image having a high similarity rate to the face image in the image being played back at a time of detection of the user action.

Similarity rate index values utilized for calculating similarity rates in this processing is data as follows.
  (a) A face size of a face included in an image frame (SRfs)
  (b) A face position of a face included in an image frame (SRfp)
  (c) Luminance of face included in image frame (SRfL)
  (d) Pixel value histogram of face included in image frame (SRfH)

After these four types of similarity rate evaluation index values are calculated, a final similarity rate (Similarity Rate: SR) is calculated according to following (Mathematical formula 2) similarly to (Mathematical formula 1) described above.

$$SR=(w1 \times SRfs)+(w2 \times SRfp)+(w3 \times SRfL)+(w4 \times SRfH) \quad \text{(Mathematical formula 2)}$$

In (Mathematical formula 2) described above, w1 to w4 are predetermined weighting factors.

Moreover, the calculated similarity rate (SR) is compared with a predetermined threshold value, and replacement of the face image is performed in a case where the similarity rate (SR) is equal to or higher than the threshold value.

Thus, processing of replacing only face images may be performed.

7. HARDWARE CONFIGURATION EXAMPLE OF INFORMATION PROCESSING DEVICE

Next, a hardware configuration example of the information processing device that executes processing according to the above-described embodiments will be described with reference to FIG. 18.

The hardware illustrated in FIG. 18 is an example of a hardware configuration of the content playback device 100 or content distribution server 200 that is the information processing device according to the present disclosure.

The hardware configuration illustrated in FIG. 18 will be described.

A central processing unit (CPU) 301 functions as a data processing unit that executes various kinds of processing according to a program stored in a read only memory (ROM) 302 or a storage unit 308. For example, processing according to the sequences described in the above-described embodiments is executed. A random access memory (RAM) 303 stores a program executed by the CPU 301, data, or the like. These CPU 301, the ROM 302, and the RAM 303 are connected to one another by a bus 304.

The CPU 301 is connected to an input/output interface 305 via the bus 304, and an input unit 306 including various sensors, a camera, a switch, a keyboard, a mouse, a microphone, or the like, and an output unit 307 including a display, a speaker, or the like are connected to the input/output interface 305.

The storage unit 308 connected to the input/output interface 305 includes, for example, a hard disk or the like, and stores a program executed by the CPU 301 and various data. A communication unit 309 functions as a transmission/reception unit for data communication via a network such as the Internet or a local area network, and communicates with an external device.

A drive 310 connected to the input/output interface 305 drives a removable medium 311 such as a magnetic disk, an optical disk, a magneto-optical disk, or a semiconductor memory such as a memory card, and executes recording or reading of data.

8. CONCLUSION OF CONFIGURATION ACCORDING TO PRESENT DISCLOSURE

Hereinabove, the embodiments of the present disclosure have been described in detail with reference to specific embodiments. However, it is obvious that those skilled in the art may make modifications or substitutions to the embodiment without departing from the scope of the present disclosure. That is, the present invention has been disclosed in a form of exemplification, and should not be interpreted to be limited. In order to determine the scope of the present disclosure, the claims should be taken into consideration.

Note that the following configurations can be used for the technology disclosed in the present specification.

(1)

An information processing device including a data processing unit that, in a case where a user action on playback content is detected, replaces a playback image frame in the playback content with a performer reaction image frame including a scene of a performer in reaction, and plays back the performer reaction image frame.

(2)

The information processing device according to (1), in which the data processing unit selects the performer reaction image frame from the playback content.

(3) The information processing device according to (1) or (2), in which the data processing unit calculates a similarity rate between a playback image frame at a time of detection of the user action and a performer reaction image frame, and selects and plays back a performer reaction image frame of which calculated similarity rate is equal to or higher than a predetermined threshold value.

(4)

The information processing device according to (3), in which the data processing unit utilizes, as an index value of the similarity rate, at least one of (a) a face size of a face included in an image frame,
(b) a face position of a face included in an image frame,
(c) an overall luminance of an image frame, or
(d) a pixel value histogram of an entire image frame.

(5)

The information processing device according to (3), in which the data processing unit calculates, as the similarity rate, a weighted addition value of each data of (a) a face size of a face included in an image frame,
(b) a face position of a face included in an image frame,
(c) an overall luminance of an image frame, and
(d) a pixel value histogram of an entire image frame.

(6)

The information processing device according to (1), in which the data processing unit, in a case where there is a plurality of performer reaction image frames in the playback content, selects and plays back a performer reaction image frame most similar to a playback image frame at a time of detection of the user action.

(7)

The information processing device according to any one of (1) to (5), in which the data processing unit, after replacing to the performer reaction image frame and starting playback processing, executes playback image switching processing of switching from playback of the performer reaction image frame to playback of an original playback content.

(8)

The information processing device according to (7), in which the data processing unit, at a time of the playback image switching processing, analyzes a similarity rate between the performer reaction image frame being played back and an image frame of the original playback content, and executes playback image switching processing at a timing when an image frame having a higher similarity rate is achieved.

(9)

The information processing device according to any one of (1) to (8), in which the data processing unit, with reference to correspondence data to (p) an image frame number of a playback image, and
(q) a number for a performer reaction image frame for replacement, (p) and (q) being registration data previously stored in a storage unit, acquires a number for a performer reaction image frame for replacement, the number registered in association with an image frame number of a playback image at a time point when the user action is detected, and plays back an image frame corresponding to the acquired number for the performer reaction image frame for replacement.

(10)

The information processing device according to (9), in which the registration data is registration data corresponding to a type of the user action, and the data processing unit acquires, from the storage unit, the detected registration data corresponding to a type of the user action, and decides a playback image frame.

(11)

The information processing device according to any one of (1) to (10), in which the playback content includes reception content from a content distribution server, or playback content from a recording medium.

(12)

An information processing system including a content distribution server and a content playback device, in which the content playback device plays back distribution content in the content distribution server, and detects a user action on playback content, and transmits detected user action information to the content distribution server, and the content distribution server, according to the user action information received from the content playback device, replaces an image frame in the distribution content with a performer reaction image frame including a scene of a performer in reaction, and distributes the performer reaction image frame.

(13)

The information processing system according to (12), in which the content distribution server selects the performer reaction image frame from the distribution content.

(14)

The information processing system according to (12) or (13), in which the content distribution server calculates a similarity rate between a playback image frame at a time of detection of the user action and performer reaction image frame, and selects and distributes a performer reaction image frame of which calculated similarity rate is equal to or higher than a predetermined threshold value.

(15)

The information processing system according to any one of (12) to (14), in which the content distribution server, after replacing to the performer reaction image frame and starting distribution processing, executes distribution image switching processing of switching from distribution of the performer reaction image frame to distribution of an original distribution content.

(16)

The information processing system according to (15), in which the content distribution server,
at a time of the distribution image switching processing,
analyzes a similarity rate between the performer reaction image frame being distributed and an image frame of the original distribution content, and executes distribution image switching processing at a timing when an image frame having a higher similarity rate is achieved.

(17)

An information processing method executed in an information processing device,
in which a data processing unit,
in a case where a user action on playback content is detected, replaces a playback image frame in the playback content with a performer reaction image frame including a scene of a performer in reaction, and plays back the performer reaction image frame.

(18)

An information processing method executed in an information processing system including a content distribution server and a content playback device,
in which the content playback device
plays back distribution content in the content distribution server, and
detects a user action on playback content, and transmits detected user action information to the content distribution server, and
the content distribution server, according to the user action information received from the content playback device,
replaces an image frame in the distribution content with a performer reaction image frame including a scene of a performer in reaction, and distributes the performer reaction image frame.

(19)

A program causing an information processing device to execute information processing, and
causing a data processing unit to,
in a case where a user action on playback content is detected, replace a playback image frame in the playback content with a performer reaction image frame including a scene of a performer in reaction, and play back the performer reaction image frame.

A series of processing described in the specification can be executed by hardware, software, or a composite configuration of both. In a case where processing by software is executed, a program on which a processing sequence is recorded can be installed on a memory in a computer incorporated in dedicated hardware and executed, or the program can be installed on a general-purpose computer capable of executing various kinds of processing and executed. For example, the program can be recorded on a recording medium beforehand. Other than installation from the recording medium on the computer, the program can be received via a network such as a local area network (LAN) or the Internet and installed on a recording medium such as a built-in hard disk.

Note that the various kinds of processing described in the specification may be executed not only in time series according to the description but also in parallel or individually according to processing capability of a device that executes the processing, or as necessary. Furthermore, in the present specification, a system refers to a logical set of a plurality of devices, and is not limited to a device having each configuration in the same housing.

INDUSTRIAL APPLICABILITY

As described above, according to the configuration of one embodiment according to the present disclosure, an apparatus and a method for replaying a performer reaction image frame including a scene of a performer in reaction in accordance with a user action on playback content are realized.

Specifically, for example, in a case where a user action on the playback content is detected and the user action is detected, the playback image frame in the playback content is replaced with a performer reaction image frame including a scene of a performer in reaction and the performer reaction image frame is played back. A data processing unit calculates a similarity rate between the playback image frame at a time of detection of the user action and a performer reaction image frame, and selects and plays back a performer reaction image frame of which calculated similarity rate is equal to or higher than a predetermined threshold value.

According to the configuration, there is achieved a device and method for playing back a performer reaction image frame in response to a user action on playback content, the performer reaction image frame including a scene of a performer in reaction.

REFERENCE SIGNS LIST

10 Playback content
20 Viewer/listener (user)
100 Content playback device
111 Input unit
112 Data processing unit
113 Output unit
114 Storage unit
115 Content recording medium
121 Camera
122 Microphone
123 Mouse
124 Keyboard
125 Touch panel
126 Hand controller
131 User action analysis unit
132 Content replacement processing unit
133 Content output unit
141 Communication unit
142 Medium IF
200 Content distribution server
201 Communication unit
210 Data processing unit
211 User action analysis unit
212 Content replacement processing unit
213 Content output unit
221 Medium IF
222 Storage unit
301 CPU
302 ROM
303 RAM
304 Bus
305 Input/output interface
306 Input unit
307 Output unit
308 Storage unit 309 Communication unit
310 Drive
311 Removable medium

The invention claimed is:

1. An information processing device, comprising:
a central processing unit (CPU) configured to:
calculate, in response to detection of a user action on playback content, a similarity rate between a playback image frame in the playback content and a plurality of performer reaction image frames, wherein
each of the plurality of performer reaction image frames includes a scene of a performer in reaction, and
the calculated similarity rate is a weighted addition value of each data of:
(a) a face size of a face included in an image frame,
(b) a face position of a face included in an image frame,
(c) an overall luminance of an image frame, and
(d) a pixel value histogram of an entire image frame;
select, based on the calculated similarity rate, a performer reaction image frame from the plurality of performer reaction image frames, wherein the calculated similarity rate of the selected performer reaction image frame is equal to or higher than a threshold value;
replace the playback image frame in the playback content with the selected performer reaction image frame; and
play back the selected performer reaction image frame.

2. The information processing device according to claim 1, wherein the CPU is further configured to select a performer reaction image frame from the playback content.

3. The information processing device according to claim 1, wherein the CPU is further configured to calculate the similarity rate as the weighted addition value of a plurality of index values, wherein the plurality of index values includes a first index value of (a), a second index value of (b), a third index value of (c), and a fourth index value of (d).

4. The information processing device according to claim 1, wherein
the playback content includes the plurality of performer reaction image frames, and
the CPU is further configured to select and play back a performer reaction image frame that is most similar to the playback image frame at a time of the detection of the user action.

5. The information processing device according to claim 1, wherein the CPU, after the replacement and start of the play back of the selected performer reaction image frame, is further configured to:
execute playback image switching processing to switch from playback of the selected performer reaction image frame to playback of an original playback content.

6. The information processing device according to claim 5, wherein the CPU, at a time of the playback image switching processing, is further configured to:
analyze the similarity rate between the selected performer reaction image frame that is played back and an image frame of the original playback content; and
execute the playback image switching processing at a timing when an image frame having a higher similarity rate is achieved.

7. The information processing device according to claim 1, wherein the CPU is further configured to,
with reference to correspondence data to
(p) an image frame number of a playback image, and
(q) a number for a performer reaction image frame for replacement,
(p) and (q) being registration data stored in a storage unit:
acquire the number for the performer reaction image frame for the replacement, the number registered in association with the image frame number of the playback image at a time point when the user action is detected, and plays back an image frame corresponding to the acquired number for the performer reaction image frame for replacement.

8. The information processing device according to claim 7, wherein
the registration data is registration data corresponding to a type of the user action, and
the CPU is further configured to:
acquire, from the storage unit, the registration data; and
determine a playback image frame.

9. The information processing device according to claim 1, wherein the playback content includes reception content from a content distribution server, or content from a recording medium.

10. An information processing system, comprising:
a content distribution server; and
a content playback device, wherein
the content playback device is configured to:
play back distribution content in the content distribution server;
detect a user action on the distribution content; and
transmit information on the detected user action to the content distribution server, and
the content distribution server is configured to:
calculate, based on the information on the detected user action received from the content playback device, a similarity rate between a playback image frame in the distribution content and a plurality of performer reaction image frames, wherein
each of the plurality of performer reaction image frames includes a scene of a performer in reaction, and
the calculated similarity rate is a weighted addition value of each data of:
a face size of a face included in an image frame,
a face position of a face included in an image frame,
an overall luminance of an image frame, and
a pixel value histogram of an entire image frame;
select, based on the calculated similarity rate, a performer reaction image frame from the plurality of performer reaction image frames, wherein the calculated similarity rate of the selected performer reaction image frame is equal to or higher than a threshold value;
replace an image frame in the distribution content with the selected performer reaction image frame; and
distribute the selected performer reaction image frame.

11. The information processing system according to claim 10, wherein the content distribution server is further configured to select a performer reaction image frame from the distribution content.

12. The information processing system according to claim 10, wherein the content distribution server, after the replacement and start of the distribution of the selected performer reaction image frame, is further configured to:
execute distribution image switching processing to switch from distribution of the selected performer reaction image frame to distribution of an original distribution content.

13. The information processing system according to claim 12, wherein the content distribution server, at a time of the distribution image switching processing, is further configured to:
- analyze the similarity rate between the selected performer reaction image frame that is distributed and an image frame of the original distribution content; and
- execute the distribution image switching processing at a timing when an image frame having a higher similarity rate is achieved.

14. An information processing method, comprising:
in an information processing device:
- calculating, in response to detection of a user action on playback content, a similarity rate between a playback image frame in the playback content and a plurality of performer reaction image frames, wherein
  - each of the plurality of performer reaction image frames includes a scene of a performer in reaction, and
  - the calculated similarity rate is a weighted addition value of each data of:
    - a face size of a face included in an image frame,
    - a face position of a face included in an image frame,
    - an overall luminance of an image frame, and
    - a pixel value histogram of an entire image frame;
- selecting, based on the calculated similarity rate, a performer reaction image frame from the plurality of performer reaction image frames, wherein the calculated similarity rate of the selected performer reaction image frame is equal to or higher than a threshold value;
- replacing the playback image frame in the playback content with the selected performer reaction image frame; and
- playing back the selected performer reaction image frame.

15. An information processing method, comprising:
in an information processing system that includes a content distribution server and a content playback device:
- playing back, by the content playback device, distribution content in the content distribution server;
- detecting, by the content playback device, a user action on the distribution content; and
- transmitting, by the content playback device, information on the detected user action to the content distribution server; and
- calculating, by the content distribution server, based on the information on the detected user action received from the content playback device, a similarity rate between a playback image frame in the distribution content and a plurality of performer reaction image frames, wherein
  - each of the plurality of performer reaction image frames includes a scene of a performer in reaction, and
  - the calculated similarity rate is a weighted addition value of each data of:
    - a face size of a face included in an image frame,
    - a face position of a face included in an image frame,
    - an overall luminance of an image frame, and
    - a pixel value histogram of an entire image frame;
- selecting, by the content distribution server, based on the calculated similarity rate, a performer reaction image frame from the plurality of performer reaction image frames, wherein the calculated similarity rate of the selected performer reaction image frame is equal to or higher than a threshold value;
- replacing, by the content distribution server, an image frame in the distribution content with the selected performer reaction image frame; and
- distributing, by the content distribution server, the selected performer reaction image frame.

16. A non-transitory computer-readable medium having stored thereon, computer-executable instructions which, when executed by a computer, cause the computer to execute operations, the operations comprising:
- calculating, in response to detection of a user action on playback content, a similarity rate between a playback image frame in the playback content and a plurality of performer reaction image frames, wherein
  - each of the plurality of performer reaction image frames includes a scene of a performer in reaction, and
  - the calculated similarity rate is a weighted addition value of each data of:
    - a face size of a face included in an image frame,
    - a face position of a face included in an image frame,
    - an overall luminance of an image frame, and
    - a pixel value histogram of an entire image frame;
- selecting, based on the calculated similarity rate, a performer reaction image frame from the plurality of performer reaction image frames, wherein the calculated similarity rate of the selected performer reaction image frame is equal to or higher than a threshold value;
- replacing the playback image frame in the playback content with the selected performer reaction image frame; and
- playing back the selected performer reaction image frame.

* * * * *